US012067615B2

(12) United States Patent
Hockey et al.

(10) Patent No.: US 12,067,615 B2
(45) Date of Patent: *Aug. 20, 2024

(54) SYSTEMS AND METHODS FOR ESTIMATING PAST AND PROSPECTIVE ATTRIBUTE VALUES ASSOCIATED WITH A USER ACCOUNT

(71) Applicant: Plaid Inc., San Francisco, CA (US)

(72) Inventors: William Hockey, San Francisco, CA (US); Sharon Rapoport, Arlington, MA (US)

(73) Assignee: Plaid Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/316,386

(22) Filed: May 12, 2023

(65) Prior Publication Data

US 2023/0316392 A1    Oct. 5, 2023

Related U.S. Application Data

(63) Continuation of application No. 17/230,835, filed on Apr. 14, 2021, now Pat. No. 11,682,070, which is a
(Continued)

(51) Int. Cl.
*G06Q 40/02* (2023.01)
*G06F 16/951* (2019.01)

(52) U.S. Cl.
CPC .......... *G06Q 40/02* (2013.01); *G06F 16/951* (2019.01)

(58) Field of Classification Search
None
See application file for complete search history.

(56) References Cited

U.S. PATENT DOCUMENTS 5,063,507 A    11/1991 Lindsey et al.
5,237,499 A    8/1993 Garback
(Continued)

FOREIGN PATENT DOCUMENTS

EP    0848336 A1    6/1998
EP    0848338 A1    6/1998
(Continued)

OTHER PUBLICATIONS

Adam B.M., et al., "Backend Server System Design Based on REST API for Cashless Payment System on Retail Community," International Electronics Symposium (IES), Sep. 2019, pp. 208-213.
(Continued)

*Primary Examiner* — David P Sharvin
(74) *Attorney, Agent, or Firm* — Harrity & Harrity, LLP

(57) ABSTRACT

Systems and techniques are disclosed for accessing accounts associated with a user and estimating a value of an attribute associated with the user based upon the retrieved account information. Transaction data associated with an account at an external user account system is received. The transactions are categorized into transaction groups. For each transaction group, a confidence value that the group is associated with the attribute is estimated, based at least in part upon a distribution of transaction amounts for the transactions of the group over a time period associated with the group. An attribute value is estimated for each group, based at least in part upon the transaction amounts of the transaction of the group. In addition a value of the attribute for a future time period may be predicted based upon the transaction groups.

20 Claims, 18 Drawing Sheets

Related U.S. Application Data continuation of application No. 15/160,663, filed on May 20, 2016, now Pat. No. 10,984,468.

(60) Provisional application No. 62/275,726, filed on Jan. 6, 2016.

(56) References Cited

U.S. PATENT DOCUMENTS

| | | |
|---|---|---|
| 5,347,632 A | 9/1994 | Filepp et al. |
| 5,634,127 A | 5/1997 | Cloud et al. |
| 5,649,186 A | 7/1997 | Ferguson |
| 5,701,451 A | 12/1997 | Rogers et al. |
| 5,710,884 A | 1/1998 | Dedrick |
| 5,710,918 A | 1/1998 | Lagarde et al. |
| 5,721,908 A | 2/1998 | Lagarde et al. |
| 5,727,159 A | 3/1998 | Kikinis |
| 5,745,754 A | 4/1998 | Lagarde et al. |
| 5,752,246 A | 5/1998 | Rogers et al. |
| 5,778,065 A | 7/1998 | Hauser et al. |
| 5,778,367 A | 7/1998 | Wesinger, Jr. et al. |
| 5,787,403 A | 7/1998 | Randle |
| 5,793,964 A | 8/1998 | Rogers et al. |
| 5,813,007 A | 9/1998 | Nielsen |
| 5,815,665 A | 9/1998 | Teper et al. |
| 5,819,284 A | 10/1998 | Farber et al. |
| 5,835,724 A | 11/1998 | Smith |
| 5,838,910 A | 11/1998 | Domenikos et al. |
| 5,838,916 A | 11/1998 | Domenikos et al. |
| 5,845,073 A | 12/1998 | Carlin et al. |
| 5,855,018 A | 12/1998 | Chor et al. |
| 5,862,325 A | 1/1999 | Reed et al. |
| 5,870,559 A | 2/1999 | Leshem et al. |
| 5,875,296 A | 2/1999 | Shi et al. |
| 5,878,219 A | 3/1999 | Vance, Jr. et al. |
| 5,892,905 A | 4/1999 | Brandt et al. |
| 5,892,909 A | 4/1999 | Grasso et al. |
| 5,898,836 A | 4/1999 | Freivald et al. |
| 5,901,287 A | 5/1999 | Bull et al. |
| 5,903,881 A | 5/1999 | Schrader et al. |
| 5,908,469 A | 6/1999 | Botz et al. |
| 5,913,214 A | 6/1999 | Madnick et al. |
| 5,918,216 A | 6/1999 | Miksovsky et al. |
| 5,920,848 A | 7/1999 | Schutzer et al. |
| 5,926,798 A | 7/1999 | Carter |
| 5,930,764 A | 7/1999 | Melchione et al. |
| 5,930,777 A | 7/1999 | Barber |
| 5,933,604 A | 8/1999 | Inakoshi |
| 5,933,816 A | 8/1999 | Zeanah et al. |
| 5,956,720 A | 9/1999 | Fernandez et al. |
| 5,961,593 A | 10/1999 | Gabber et al. |
| 5,961,601 A | 10/1999 | Iyengar |
| 5,963,915 A | 10/1999 | Kirsch |
| 5,963,925 A | 10/1999 | Kolling et al. |
| 5,966,967 A | 10/1999 | Agrawal et al. |
| 5,978,828 A | 11/1999 | Greer et al. |
| 5,978,842 A | 11/1999 | Noble et al. |
| 5,983,267 A | 11/1999 | Shklar et al. |
| 5,983,268 A | 11/1999 | Freivald et al. |
| 5,987,440 A | 11/1999 | O'Neil et al. |
| 5,987,454 A | 11/1999 | Hobbs |
| 5,995,943 A | 11/1999 | Bull et al. |
| 5,999,971 A | 12/1999 | Buckland |
| 6,003,032 A | 12/1999 | Bunney et al. |
| 6,006,333 A | 12/1999 | Nielsen |
| 6,023,698 A | 2/2000 | Lavey, Jr. et al. |
| 6,041,362 A | 3/2000 | Mears et al. |
| 6,047,327 A | 4/2000 | Tso et al. |
| 6,055,570 A | 4/2000 | Nielsen |
| 6,078,929 A | 6/2000 | Rao |
| 6,082,776 A | 7/2000 | Feinberg |
| 6,092,196 A | 7/2000 | Reiche |
| 6,092,197 A | 7/2000 | Coueignoux |
| 6,105,131 A | 8/2000 | Carroll |
| 6,119,101 A | 9/2000 | Peckover |
| 6,138,158 A | 10/2000 | Boyle et al. |
| 6,148,337 A | 11/2000 | Estberg et al. |
| 6,151,581 A | 11/2000 | Kraftson et al. |
| 6,151,601 A | 11/2000 | Papierniak et al. |
| 6,182,142 B1 | 1/2001 | Win et al. |
| 6,185,567 B1 | 2/2001 | Ratnaraj et al. |
| 6,195,698 B1 | 2/2001 | Lillibridge et al. |
| 6,199,077 B1 | 3/2001 | Inala et al. |
| 6,205,433 B1 | 3/2001 | Boesch et al. |
| 6,208,975 B1 | 3/2001 | Bull et al. |
| 6,209,007 B1 | 3/2001 | Kelley et al. |
| 6,243,816 B1 | 6/2001 | Fang et al. |
| 6,246,999 B1 | 6/2001 | Riley et al. |
| 6,278,449 B1 | 8/2001 | Sugiarto et al. |
| 6,278,999 B1 | 8/2001 | Knapp |
| 6,292,789 B1 | 9/2001 | Schutzer |
| 6,297,819 B1 | 10/2001 | Furst |
| 6,301,584 B1 | 10/2001 | Ranger |
| 6,308,203 B1 | 10/2001 | Itabashi et al. |
| 6,311,275 B1 | 10/2001 | Jin et al. |
| 6,317,783 B1 | 11/2001 | Freishtat et al. |
| 6,360,205 B1 | 3/2002 | Iyengar et al. |
| 6,366,933 B1 | 4/2002 | Ball et al. |
| 6,401,118 B1 | 6/2002 | Thomas |
| 6,405,245 B1 | 6/2002 | Burson et al. |
| 6,412,073 B1 | 6/2002 | Rangan |
| 6,424,968 B1 | 7/2002 | Broster et al. |
| 6,430,539 B1 | 8/2002 | Lazarus et al. |
| 6,484,155 B1 | 11/2002 | Kiss et al. |
| 6,499,042 B1 | 12/2002 | Markus |
| 6,510,451 B2 | 1/2003 | Wu et al. |
| 6,519,571 B1 | 2/2003 | Guheen et al. |
| 6,567,411 B2 | 5/2003 | Dahlen |
| 6,567,850 B1 | 5/2003 | Freishtat et al. |
| 6,594,766 B2 | 7/2003 | Rangan et al. |
| 6,631,402 B1 | 10/2003 | Devine et al. |
| 6,632,248 B1 | 10/2003 | Isaac et al. |
| 6,633,910 B1 | 10/2003 | Rajan et al. |
| 6,725,200 B1 | 4/2004 | Rost |
| 6,802,042 B2 | 10/2004 | Rangan et al. |
| 6,859,931 B1 | 2/2005 | Cheyer et al. |
| 6,957,199 B1 | 10/2005 | Fisher |
| 7,028,049 B1 | 4/2006 | Shelton |
| 7,072,932 B1 | 7/2006 | Stahl |
| 7,092,913 B2 | 8/2006 | Cannon, Jr. |
| 7,200,578 B2 | 4/2007 | Paltenghe et al. |
| 7,263,548 B2 | 8/2007 | Daswani et al. |
| 7,275,046 B1 | 9/2007 | Tritt et al. |
| 7,340,411 B2 | 3/2008 | Cook |
| 7,370,011 B2 | 5/2008 | Bennett et al. |
| 7,424,520 B2 | 9/2008 | Daswani et al. |
| 7,640,210 B2 | 12/2009 | Bennett et al. |
| 7,752,535 B2 | 7/2010 | Satyavolu |
| 8,006,291 B2 | 8/2011 | Headley et al. |
| 8,010,783 B1 | 8/2011 | Cahill |
| 8,086,508 B2 | 12/2011 | Dheer et al. |
| 8,140,431 B1 | 3/2012 | Murphy |
| 8,145,914 B2 | 3/2012 | Steeves |
| 8,166,562 B2 | 4/2012 | Holvey et al. |
| 8,209,194 B1 | 6/2012 | Nidy et al. |
| 8,266,515 B2 | 9/2012 | Satyavolu |
| 8,613,066 B1 | 12/2013 | Brezinski et al. |
| 8,645,264 B2 | 2/2014 | Allison et al. |
| 8,676,611 B2 | 3/2014 | McLaughlin et al. |
| 8,739,260 B1 | 5/2014 | Damm-Goossens |
| 8,788,416 B1 | 7/2014 | Vu |
| 8,995,967 B1 | 3/2015 | Billman |
| 9,106,642 B1 | 8/2015 | Bhimanaik |
| 9,202,250 B1 | 12/2015 | Palaniappan |
| 9,418,387 B1 | 8/2016 | Aaron et al. |
| 9,430,892 B2 | 8/2016 | Amdahl |
| 9,449,346 B1 | 9/2016 | Hockey et al. |
| 9,595,023 B1 | 3/2017 | Hockey et al. |
| 9,699,187 B2 | 7/2017 | Chen et al. |
| 9,774,590 B1 | 9/2017 | Bronshtein et al. |
| 9,906,520 B2 | 2/2018 | Fouad et al. |
| 9,946,996 B1 | 4/2018 | Bedell |
| 10,003,591 B2 | 6/2018 | Hockey et al. |
| 10,104,059 B2 | 10/2018 | Hockey et al. |
| 10,319,029 B1 | 6/2019 | Hockey et al. |

(56) References Cited

U.S. PATENT DOCUMENTS

| | | |
|---|---|---|
| 10,339,608 B1 | 7/2019 | Haitz et al. |
| 10,523,653 B2 | 12/2019 | Hockey et al. |
| 10,530,761 B2 | 1/2020 | Hockey et al. |
| 10,546,348 B1 | 1/2020 | Lesner et al. |
| 10,614,463 B1 | 4/2020 | Hockey et al. |
| 10,679,303 B1 | 6/2020 | Aaron et al. |
| 10,726,491 B1 | 7/2020 | Hockey et al. |
| 10,762,559 B2 | 9/2020 | Alejo et al. |
| 10,878,421 B2 | 12/2020 | Putnam |
| 10,904,239 B2 | 1/2021 | Hockey et al. |
| 10,984,468 B1 | 4/2021 | Hockey et al. |
| 11,030,682 B1 | 6/2021 | Hockey et al. |
| 11,050,729 B2 | 6/2021 | Hockey et al. |
| 11,216,814 B1 | 1/2022 | Hockey et al. |
| 11,295,294 B1 | 4/2022 | Kurani et al. |
| 11,316,862 B1 | 4/2022 | Pate et al. |
| 11,327,960 B1 | 5/2022 | Jin et al. |
| 11,430,057 B1 | 8/2022 | Hockey et al. |
| 11,468,085 B2 | 10/2022 | Putnam et al. |
| 11,503,010 B2 | 11/2022 | Hockey et al. |
| 11,580,544 B2 | 2/2023 | Putnam |
| 2001/0011274 A1 | 8/2001 | Klug et al. |
| 2002/0002596 A1 | 1/2002 | Sugiarto et al. |
| 2002/0065772 A1 | 5/2002 | Saliba et al. |
| 2002/0091635 A1 | 7/2002 | Dilip et al. |
| 2002/0095588 A1 | 7/2002 | Shigematsu et al. |
| 2003/0023879 A1 | 1/2003 | Wray |
| 2003/0028646 A1 | 2/2003 | Wray |
| 2003/0060896 A9 | 3/2003 | Hulai et al. |
| 2003/0158960 A1 | 8/2003 | Engberg |
| 2003/0163425 A1 | 8/2003 | Cannon |
| 2003/0182035 A1 | 9/2003 | Dilodovico et al. |
| 2003/0185370 A1 | 10/2003 | Rosera et al. |
| 2003/0204460 A1 | 10/2003 | Robinson et al. |
| 2004/0059672 A1 | 3/2004 | Baig et al. |
| 2005/0027617 A1 | 2/2005 | Zucker et al. |
| 2005/0154913 A1 | 7/2005 | Barriga et al. |
| 2005/0177510 A1 | 8/2005 | Hilt et al. |
| 2005/0222929 A1 | 10/2005 | Steier et al. |
| 2005/0246269 A1 | 11/2005 | Smith |
| 2006/0015358 A1 | 1/2006 | Chua |
| 2006/0116949 A1 | 6/2006 | Wehunt et al. |
| 2006/0136332 A1 | 6/2006 | Ziegler |
| 2006/0190569 A1 | 8/2006 | Neil et al. |
| 2006/0236384 A1 | 10/2006 | Lindholm et al. |
| 2007/0179883 A1 | 8/2007 | Questembert |
| 2007/0179942 A1 | 8/2007 | Heggem |
| 2007/0198432 A1 | 8/2007 | Pitroda et al. |
| 2007/0225047 A1 | 9/2007 | Bakos |
| 2007/0255662 A1 | 11/2007 | Tumminaro |
| 2007/0289002 A1 | 12/2007 | Van Der Horst et al. |
| 2008/0051059 A1 | 2/2008 | Fisher |
| 2008/0052192 A1 | 2/2008 | Fisher |
| 2008/0052233 A1 | 2/2008 | Fisher et al. |
| 2008/0120129 A1 | 5/2008 | Seubert et al. |
| 2008/0162361 A1 | 7/2008 | Sklovsky et al. |
| 2008/0183628 A1 | 7/2008 | Oliver et al. |
| 2008/0243784 A1 | 10/2008 | Stading |
| 2008/0249931 A1 | 10/2008 | Gilder et al. |
| 2008/0250246 A1 | 10/2008 | Arditti et al. |
| 2009/0037308 A1 | 2/2009 | Feinstein |
| 2009/0070257 A1 | 3/2009 | Csoka |
| 2009/0157555 A1 | 6/2009 | Biffle et al. |
| 2009/0222900 A1 | 9/2009 | Benaloh et al. |
| 2009/0228779 A1 | 9/2009 | Williamson et al. |
| 2009/0245521 A1 | 10/2009 | Vembu et al. |
| 2009/0271847 A1 | 10/2009 | Karjala et al. |
| 2009/0328177 A1 | 12/2009 | Frey et al. |
| 2010/0027552 A1 | 2/2010 | Hill |
| 2010/0043054 A1 | 2/2010 | Kidwell |
| 2010/0049850 A1 | 2/2010 | Nanduri et al. |
| 2010/0169072 A1 | 7/2010 | Zaki et al. |
| 2010/0185868 A1 | 7/2010 | Grecia |
| 2010/0223160 A1 | 9/2010 | Brown |
| 2010/0235882 A1 | 9/2010 | Moore |
| 2010/0313255 A1 | 12/2010 | Khuda |
| 2010/0325710 A1 | 12/2010 | Etchegoyen |
| 2011/0055079 A1 | 3/2011 | Meaney et al. |
| 2011/0196790 A1 | 8/2011 | Milne |
| 2011/0238550 A1 | 9/2011 | Reich et al. |
| 2011/0247060 A1 | 10/2011 | Whitmyer, Jr. |
| 2011/0295731 A1* | 12/2011 | Waldron, III ...... G06Q 10/0635 705/35 |
| 2012/0059706 A1 | 3/2012 | Goenka et al. |
| 2012/0116880 A1 | 5/2012 | Patel et al. |
| 2012/0129503 A1 | 5/2012 | Lindeman et al. |
| 2012/0191603 A1 | 7/2012 | Nuzzi |
| 2012/0209775 A1 | 8/2012 | Milne |
| 2012/0215688 A1 | 8/2012 | Musser et al. |
| 2012/0233212 A1 | 9/2012 | Newton et al. |
| 2012/0246073 A1 | 9/2012 | Gore et al. |
| 2012/0253876 A1 | 10/2012 | Hersch |
| 2012/0278201 A1 | 11/2012 | Milne |
| 2012/0281058 A1 | 11/2012 | Laney et al. |
| 2012/0284175 A1 | 11/2012 | Wilson et al. |
| 2012/0323717 A1 | 12/2012 | Kirsch |
| 2013/0019297 A1 | 1/2013 | Lawson et al. |
| 2013/0041736 A1 | 2/2013 | Coppinger |
| 2013/0041739 A1 | 2/2013 | Coppinger |
| 2013/0041744 A1 | 2/2013 | Coppinger |
| 2013/0046599 A1 | 2/2013 | Coppinger |
| 2013/0097685 A1 | 4/2013 | Kennedy et al. |
| 2013/0125223 A1 | 5/2013 | Sorotokin et al. |
| 2013/0174015 A1 | 7/2013 | Jeff |
| 2013/0191526 A1 | 7/2013 | Zhao |
| 2013/0232006 A1 | 9/2013 | Holcomb et al. |
| 2013/0232159 A1 | 9/2013 | Daya et al. |
| 2013/0247005 A1 | 9/2013 | Hirsch et al. |
| 2013/0282577 A1 | 10/2013 | Milne |
| 2013/0318592 A1 | 11/2013 | Grier, Sr. et al. |
| 2014/0032414 A1 | 1/2014 | Beisner et al. |
| 2014/0040148 A1 | 2/2014 | Ozvat et al. |
| 2014/0044123 A1 | 2/2014 | Lawson et al. |
| 2014/0067499 A1 | 3/2014 | Stepanovich |
| 2014/0150072 A1 | 5/2014 | Castro et al. |
| 2014/0165156 A1 | 6/2014 | Fushman et al. |
| 2014/0173695 A1 | 6/2014 | Valdivia |
| 2014/0180962 A1 | 6/2014 | Fiala et al. |
| 2014/0189002 A1 | 7/2014 | Orioli et al. |
| 2014/0189808 A1 | 7/2014 | Mahaffey et al. |
| 2014/0189828 A1 | 7/2014 | Baghdasaryan et al. |
| 2014/0208389 A1 | 7/2014 | Kelley |
| 2014/0215551 A1 | 7/2014 | Allain et al. |
| 2014/0229462 A1 | 8/2014 | Lo |
| 2014/0236716 A1 | 8/2014 | Shapiro et al. |
| 2014/0245411 A1 | 8/2014 | Meng et al. |
| 2014/0258063 A1* | 9/2014 | Chourasia ............ G06Q 40/00 705/35 |
| 2014/0280555 A1 | 9/2014 | Tapia et al. |
| 2014/0344141 A1 | 11/2014 | Cook |
| 2014/0358704 A1 | 12/2014 | Banerjee et al. |
| 2014/0365350 A1 | 12/2014 | Shvarts |
| 2015/0026024 A1 | 1/2015 | Calman et al. |
| 2015/0046338 A1 | 2/2015 | Laxminarayanan et al. |
| 2015/0066719 A1 | 3/2015 | Agrawal et al. |
| 2015/0066765 A1 | 3/2015 | Banks et al. |
| 2015/0088707 A1 | 3/2015 | Drury et al. |
| 2015/0088732 A1 | 3/2015 | DeVan, Jr. et al. |
| 2015/0113511 A1 | 4/2015 | Poulin |
| 2015/0161608 A1 | 6/2015 | Gilbert et al. |
| 2015/0193871 A1 | 7/2015 | Murphy |
| 2015/0254672 A1 | 9/2015 | Huesch et al. |
| 2015/0281225 A1 | 10/2015 | Schoen et al. |
| 2015/0310562 A1 | 10/2015 | Chourasia et al. |
| 2015/0339664 A1 | 11/2015 | Wong et al. |
| 2015/0365399 A1 | 12/2015 | Biswas et al. |
| 2016/0063657 A1 | 3/2016 | Chen et al. |
| 2017/0118301 A1 | 4/2017 | Kouru et al. |
| 2017/0132633 A1 | 5/2017 | Whitehouse |
| 2017/0148021 A1 | 5/2017 | Goldstein et al. |
| 2017/0193112 A1 | 7/2017 | Desineni et al. |
| 2017/0193486 A1 | 7/2017 | Parekh |
| 2017/0200137 A1 | 7/2017 | Mlmont |
| 2017/0200234 A1 | 7/2017 | Morse et al. |

(56) References Cited

U.S. PATENT DOCUMENTS

| | | |
|---|---|---|
| 2017/0262840 A1 | 9/2017 | Dunwoody |
| 2017/0300960 A1 | 10/2017 | Khvostov et al. |
| 2017/0308902 A1 | 10/2017 | Quiroga et al. |
| 2018/0060927 A1 | 3/2018 | Gupta |
| 2018/0157851 A1 | 6/2018 | Sgambati et al. |
| 2018/0191685 A1 | 7/2018 | Bajoria |
| 2018/0196694 A1 | 7/2018 | Banerjee et al. |
| 2018/0232734 A1 | 8/2018 | Smets et al. |
| 2018/0246943 A1 | 8/2018 | Avagyan et al. |
| 2018/0267847 A1 | 9/2018 | Smith et al. |
| 2018/0267874 A1 | 9/2018 | Keremane et al. |
| 2018/0330342 A1 | 11/2018 | Prakash et al. |
| 2018/0349909 A1 | 12/2018 | Allen et al. |
| 2018/0367428 A1 | 12/2018 | Di Pietro et al. |
| 2019/0075115 A1 | 3/2019 | Anderson et al. |
| 2019/0180364 A1 | 6/2019 | Chong et al. |
| 2019/0333159 A1 | 10/2019 | Chourasia et al. |
| 2019/0354544 A1 | 11/2019 | Hertz et al. |
| 2020/0110585 A1 | 4/2020 | Perry |
| 2020/0234376 A1 | 7/2020 | Lord et al. |
| 2021/0004439 A1 | 1/2021 | Xiong et al. |
| 2021/0165960 A1 | 6/2021 | Eisenschlos et al. |
| 2021/0233162 A1 | 7/2021 | Hockey et al. |
| 2021/0288956 A1 | 9/2021 | Hockey et al. |
| 2021/0350340 A1 | 11/2021 | Lai et al. |
| 2022/0217147 A1 | 7/2022 | Pate et al. |
| 2022/0229980 A1 | 7/2022 | Jin et al. |
| 2022/0327141 A1 | 10/2022 | Putnam et al. |

FOREIGN PATENT DOCUMENTS

| | | |
|---|---|---|
| EP | 0848339 A1 | 6/1998 |
| EP | 2747374 A1 | 6/2014 |
| EP | 3347846 A1 | 7/2018 |
| WO | 9638795 A1 | 12/1996 |
| WO | 9709682 A1 | 3/1997 |
| WO | 9710542 A1 | 3/1997 |
| WO | 9726612 A1 | 7/1997 |
| WO | 9737314 A1 | 10/1997 |
| WO | 9814896 A1 | 4/1998 |
| WO | 0025227 A1 | 5/2000 |
| WO | 2017044479 A1 | 3/2017 |
| WO | 2017173021 A1 | 10/2017 |
| WO | 2022082186 A1 | 4/2022 |

OTHER PUBLICATIONS

Business Wire., "Cognisoft Announces IntelliServ, A Revolutionary Intranet Information Management Application; a Powerful Solution that Enables the Right Information to Find the Right User at the Right Time," Business Wire, 1996, p. 8140125.

Business Wire., "FirstFloor and AirMedia Announce Partnership," 1997.

Business Wire., "GC Tech's GlobeID Payment Internet Commerce Software Supports Microsoft, Merchant Server," Jan. 1997, p. 1211286.

Chard et al., "Efficient and Secure Transfer, Synchronization, and Sharing of Big Data", IEEE Cloud Computing, 2014, vol. 1(3), pp. 46-55.

Chaulagain R.S., et al., "Cloud Based Web Scraping for Big Data Application," IEEE International Conference on Smart Cloud, Nov. 2017, pp. 138-143.

Corena et al., "Secure and fast aggregation of financial data in cloud-based expense tracking applications." Journal of Network and Systems Management, 2012, vol. 20(4), 534-560.

Devlin J., et al., "BERT: Pre-training of Deep Bidirectional Transformers for Language Understanding", May 24, 2019, 16 pages.

Douglis "The AT&T Internet Difference Engine: Tracking and Viewing Changes on the Web," World Wide Web, Jan. 1998, vol. 1(1), pp. 27-44.

European Search Report in EP Application No. 21215799.4 dated Mar. 25, 2022, 8 pages.

Examination Report in AU Application No. 2016321166 dated Dec. 7, 2020, 5 pages.

Examination Report in CA Application No. 2997115, dated Apr. 2, 2020.

Examination Report in CA Application No. 2997115, dated Jun. 20, 2019.

Examination Report in CA Application No. 2997115, dated Nov. 13, 2019.

Examination Report in CA Application No. 2997115 dated Nov. 2, 2020, 3 pages.

Examination Report in CA Application No. 3119897 dated Jul. 30, 2021, 6 pages.

Examination Report in EP Application No. 16844973.4 dated Nov. 4, 2020, 6 pages.

Fujitsu ., "Fujitsu Announces 'WebAgent' Application as part of ByeDesk Link Wireless Server Software," Business Wire, Sep. 1998.

Fujitsu., "Fujitsu Announces Availability of ByeDesk Link for Alpha-Numeric Pagers; Next Step in Empowering Mobile Workforces with 'Anyplace, Anytime' Information," Business Wire, Jul. 1998.

Fujitsu., "Fujitsu's ByeDesk Link Now Available on the PalmPilot," Business Wire, Sep. 1998.

Fujitsu., "Fujitsu Picks NetMind for Wireless Web Agent Software," Computergram International, Sep. 1998.

Google Groups., "Automatic Notification of Web Sites Changes," Aug. 1995.

Google Groups., "Versatile Intelligent Agents in Commercial Applications," Dec. 1998.

Hagel J., et al., "The Coming Battle for Customer Information," Harvard Business Review, Jan.-Feb. 1997, reprint No. 97104.

Hummer W., et al., "Ws-Aggregation: Distributed of Web Services Data," Proceedings of the 2011 ACM Symposium on Applied Computing. ACM, 2011.

International Preliminary Report on Patentability in International Application No. PCT/US2021/030808, mailed on Nov. 8, 2022, 6 pages.

International Search Report and Written Opinion in PCT Application No. PCT/US2021/030808, mailed onJun. 21, 2021, 11 pages.

International Search Report and Written Opinion in PCT Application No. PCT/US2021/071851, dated Dec. 13, 2021, 10 pages.

International Search Report in PCT Application No. PCT/US2016/050536, dated Dec. 15, 2016.

Jin C., "How Plaid Parses Transaction Data," Oct. 22, 2020, 10 pages, retrieved from the internet URL: https://plaid.com/blog/how-plaid-parsestransaction-data/.

Johner et al., "Sign on with IBM's Global Sign-On!" IBM manual, Nov. 1998. Part 1, in 184 pages.

Johner et al., "Sign on with IBM's Global Sign-Onl" IBM manual, Nov. 1998. Part 2, pp. 166-307.

Kim Y.G. et al., "A Design of User Authentication System Using QR code Identifying Method," 6th International Conference on Computer Sciences and Convergence Information Technology (ICCIT), pp. 31-35, 2011.

Knoblock C.A., et al., "A Hierarchical Approach to Wrapper Induction," In Proceedings of the 3rd International Conference on Autonomous Agents, May 1999.

Knoblock C.A., et al., "Building Agents for Internet-base Supply Chain Integration," In Proceedings of the Workshop on Agents for Electronic Commerce and Managing the Internet-Enabled Supply Chain, May 1999.

Knoblock C.A., et al., "Semi-automatic wrapper generation for Internet information sources," In Proceedings of the Second IFCIS International Conference on Cooperative Information Systems, Jun. 1997.

Knoblock C.A., et al., "Intelligent caching for information mediators: A kr based approach," In Proceedings of the Workshop on Knowledge Representation meets Databases (KRDB), May 1998.

Knoblock C.A., et al., "Modeling Web Sources for Information Integration," In Proceedings of the Fifteenth National Conference on Artificial Intelligence, 1998. Jul. 1998.

Knoblock C.A., et al., "Optimizing Information Agents by Selectively Materializing Data," In Proceedings of the AAAI'98 Workshop on AII and Information Integration, Jul. 1998.

(56) References Cited

OTHER PUBLICATIONS

Knoblock C.A., et al., "The Ariadne Approach to Web-based Information Integration," IEEE Intelligent Systems, Sep. 1998, 13(5).
Knoblock C.A., et al., "Wrapper generation for semi-structured Internet sources," In Proceedings of the Workshop on Management of Semistructured Data, May 1997.
Knoblock C.A., et al., "Wrapper induction for semistructured, web-based information sources," In Proceedings of the Conference on Automated Learning and Discovery Workshop on Learning from Text and the Web, Jun. 1998.
Kravitz D.W., "Highly Scalable On-Line Payments via Task Decoupling," Financial Cryptography First International Conference, 1998, p. 355-373.
Kyeongwon C., et. al., 'A Mobile based Anti-Phishing Authentication Scheme using QR code', IEEE International Conference on Mobile IT Convergence, 2011, pp. 109-113.
Mancini E., et al., "Simulation in the Cloud Using Handheld Devices," Workshop on Modeling and Simulation on Grid and Cloud Computing, Apr. 2012, 8 pages.
McChesney M.C., et al., "Banking in Cyberspace: an Investment in Itself," IEEE Spectrum, Feb. 1997, vol. 34(2), pp. 54-59.
"Minding Web Site Changes," PC Week, Sep. 1998.
Mohammed et al., "A Multi-layer of Multi Factors Authentication Model for Online Banking Services," International Conference on Computing, Electrical and Electronic Engineering (ICCEEE), 2013, pp. 220-224.
Neville S.W., et al., "Efficiently Archieving Full Three-Way Non-repudiation in Consumer-level eCommerce and M-Commerce Transactions," 2011 IEEE 10th International Conference on Trust, Security and Privacy in Computing and Communications, Nov. 2011, pp. 664-672.
O'Riain S., et al., "XBRL and open data for global financial ecosystems: A linked data approach," International Journal of Accounting Information Systems, 2013, vol. 13(2), pp. 141-162.
Part 1 of various documents related to MaxMiles and/or MileageManager, as obtained from *Yodlee Inc. v. Plaid Technologies Inc.*, Civil Action No. 14-cv-01445-LPS and/or *Yodlee Inc. v. Cashedge Inc.*, Civil Action No. 05-cv-01550-SI. To the best of Applicant's knowledge, MaxMiles and/or MileageManager were products and/or services offered around 1997 or earlier.
Part 10 of various documents related to MaxMiles and/or MileageManager, as obtained from *Yodlee Inc. v. Plaid Technologies Inc.*, Civil Action No. 14-cv-01445-LPS and/or *Yodlee Inc. v. Cashedge Inc.*, Civil Action No. 05-cv-01550-SI. To the best of Applicant's knowledge, MaxMiles and/or MileageManager were products and/or services offered around 1997 or earlier.
Part 11 of various documents related to MaxMiles and/or MileageManager, as obtained from *Yodlee Inc. v. Plaid Technologies Inc.*, Civil Action No. 14-cv-01445-LPS and/or *Yodlee Inc. v. Cashedge Inc.*, Civil Action No. 05-cv-01550-SI. To the best of Applicant's knowledge, MaxMiles and/or MileageManager were products and/or services offered around 1997 or earlier.
Part 2 of various documents related to MaxMiles and/or MileageManager, as obtained from *Yodlee Inc. v. Plaid Technologies Inc.*, Civil Action No. 14-cv-01445-LPS and/or *Yodlee Inc. v. Cashedge Inc.*, Civil Action No. 05-cv-01550-SI. To the best of Applicant's knowledge, MaxMiles and/or MileageManager were products and/or services offered around 1997 or earlier.
Part 3 of various documents related to MaxMiles and/or MileageManager, as obtained from *Yodlee Inc. v. Plaid Technologies Inc.*, Civil Action No. 14-cv-01445-LPS and/or *Yodlee Inc. v. Cashedge Inc.*, Civil Action No. 05-cv-01550-SI. To the best of Applicant's knowledge, MaxMiles and/or MileageManager were products and/or services offered around 1997 or earlier.
Part 4 of various documents related to MaxMiles and/or MileageManager, as obtained from *Yodlee Inc. v. Plaid Technologies Inc.*, Civil Action No. 14-cv-01445-LPS and/or *Yodlee Inc. v. Cashedge Inc.*, Civil Action No. 05-cv-01550-SI. To the best of Applicant's knowledge, MaxMiles and/or MileageManager were products and/or services offered around 1997 or earlier.
Part 5 of various documents related to MaxMiles and/or MileageManager, as obtained from *Yodlee Inc. v. Plaid Technologies Inc.*, Civil Action No. 14-cv-01445-LPS and/or *Yodlee Inc. v. Cashedge Inc.*, Civil Action No. 05-cv-01550-SI. To the best of Applicant's knowledge, MaxMiles and/or MileageManager were products and/or services offered around 1997 or earlier.
Part 6 of various documents related to MaxMiles and/or MileageManager, as obtained from *Yodlee Inc. v. Plaid Technologies Inc.*, Civil Action No. 14-cv-01445-LPS and/or *Yodlee Inc. v. Cashedge Inc.*, Civil Action No. 05-cv-01550-SI. To the best of Applicant's knowledge, MaxMiles and/or MileageManager were products and/or services offered around 1997 or earlier.
Part 7 of various documents related to MaxMiles and/or MileageManager, as obtained from *Yodlee Inc. v. Plaid Technologies Inc.*, Civil Action No. 14-cv-01445-LPS and/or *Yodlee Inc. v. Cashedge Inc.*, Civil Action No. 05-cv-01550-SI. To the best of Applicant's knowledge, MaxMiles and/or MileageManager were products and/or services offered around 1997 or earlier.
Part 8 of various documents related to MaxMiles and/or MileageManager, as obtained from *Yodlee Inc. v. Plaid Technologies Inc.*, Civil Action No. 14-cv-01445-LPS and/or *Yodlee Inc. v. Cashedge Inc.*, Civil Action No. 05-cv-01550-SI. To the best of Applicant's knowledge, MaxMiles and/or MileageManager were products and/or services offered around 1997 or earlier.
Part 9 of various documents related to MaxMiles and/or MileageManager, as obtained from *Yodlee Inc. v. Plaid Technologies Inc.*, Civil Action No. 14-cv-01445-LPS and/or *Yodlee Inc. v. Cashedge Inc.*, Civil Action No. 05-cv-01550-SI. To the best of Applicant's knowledge, MaxMiles and/or MileageManager were products and/or services offered around 1997 or earlier.
PR Newswire., "Boeing Chooses NetMind Enterprise Minder to Help Thousands of Employees Track Web-Based Information," Nov. 1998.
PR Newswire., "NetMind Accepts $7 Million Strategic Investment From Three Prominent VC Firms—BancBoston, Softbank and Draper Fisher Jurvestson," Nov. 1998.
PR Newswire., "NetMind Updates the World's Largest Free Web Tracking Service," PR Newswire, Sep. 1998.
Quwaider M., et al., "Experimental Framework for Mobile Cloud Computing System," Jordan University of Science and Technology, Procedia Computer Science 52, 2015, pp. 1147-1152.
Sullivan E., "Caravelle's InfoWatcher 1.1 Keeps an Eye on the Web," PC Week 1997.
Sunwoo D., et al., "A Structured Approach to the Simulation, Analysis and Characterization of Smartphone Applications", IEEE 2013, pp. 113-122.
Supplementary European Search Report in EP Application No. 16844973.4, dated Jan. 4, 2019.
U.S. Appl. No. 14/719,110, System and Method for Programmatically Accessing Financial Data, filed May 21, 2015.
U.S. Appl. No. 14/719,117, System and Method for Facilitating Programmatic Verification of Transactions, filed May 21, 2015.
U.S. Appl. No. 17/302,630, System and Method for Programmatically Accessing Data, filed May 7, 2021.
U.S. Appl. No. 17/533,728, System and Method for Facilitating Programmatic Verification of Transactions, filed Nov. 23, 2021.
U.S. Appl. No. 17/815,024, Parameter-based Computer Evaluation of User Accounts Based on User Account Data Stored in One or More Databases, filed Jul. 26, 2022.
"Web Interface Definition Language (WIDL)", W3 Consortium submission from webMethods, Inc., Sep. 22, 1997.
WebVCR product bulletin and documentation, NetResults Corporation, 1996. We understand that, with respect to issues raised by this litigation, the WebVCR product as available in 1996 provided substantially the same functionality as is described at http://www.n2r6.com/fs_webvcr_info.html.
WebVCR web service, which is described by at least the following references: The WebVCR product bulletin and documentation, NetResults Corporation, 1996 and http://www.n2r6.com/fs_webvor_info.html.

(56) References Cited

OTHER PUBLICATIONS

Zhao Y., et al., "A Single Login Web Service Integrator—WebEntrance," Sixth International World Wide Web Conference, Apr. 1997, pp. 7-11.
Zhao Y., et al., "WebEntree: A Web Service Aggregator" IBM Systems Journal, 1998, vol. 37(4), pp. 584-595.

* cited by examiner

Proxy Instance User A Bank 1 121

User: "User A"
Institution: "Bank 1 141"
Credentials: <User A Credentials Bank 1>
Properties: <User A Properties Bank 1>

Proxy Instance User A Bank 2 122

User: "User A"
Institution: "Bank 2 142"
Credentials: <User A Credentials Bank 2>
Properties: <User A Properties Bank 2>

Proxy Instance User B Bank 2 123

User: "User B"
Institution: "Bank 2 142"
Credentials: <User B Credentials Bank 2>
Properties: <User B Properties Bank 2>

FIG. 2

Dev Account B Proxy Instance User A Bank 1 421

Dev Account B User: "User A"
Institution: "Bank 1 141"
Credentials: <User A Credentials Bank 1>
Properties: <User A Properties Bank 1>

Dev Account B Proxy Instance User A Bank 2 422

Dev Account B User: "User A"
Institution: "Bank 2 142"
Credentials: <User A Credentials Bank 2>
Properties: <User A Properties Bank 2>

Dev Account B Proxy Instance User B Bank 2 423

Dev Account B User: "User B"
Institution: "Bank 2 142"
Credentials: <User B Credentials Bank 2>
Properties: <User B Properties Bank 2>

Dev Account A Proxy Instance User C Bank 1 424

Dev Account A User: "User C"
Institution: "Bank 1 141"
Credentials: <User C Credentials Bank 1>
Properties: <User C Properties Bank 1>

Dev Account A Proxy Instance User C Bank 2 425

Dev Account A User: "User C"
Institution: "Bank 2 142"
Credentials: <User C Credentials Bank 2>
Properties: <User C Properties Bank 2>

FIG. 4B

NEW USER WITH STATE SUBMIT

```
curl -X    T   ps://bankA  l.example/au
 -d client_id= CLIENT_ID}
 -d secre =   ECRET} \
 -d creden ials='{
  "username":"plaid_ es ",
  "password":"plaid_good",
  "s a e":" x"}'
 -d  ype= TY  E}
```

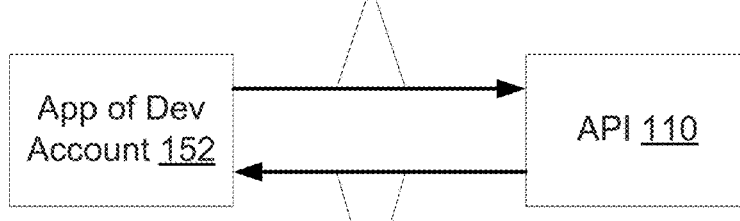

AUTH RESPONSE

```
  p code 200
"accoun s": [{
"_id": "52db1be4be13cbXXXXXXXXXX",
"_item": "52af631671c3bdXXXXXXXXXX",
"_user": "52af630f71c3bdXXXXXXXXXX",
"balance":
  "available": 1400,
  "curren ": 1230
},
"me a":
  "name": "My   avings",
  "number": "31015"
},
"numbers":
  "rou ing": "0000000",
  "accoun ": "1111111",
  "wireRou ing": "2222222"
},
"ins itution_ ype": "c  ase",
" ype": "depository",
"s a us": "normal",
},
...], "access_ oken": "xxxxx"}
```

FIG. 7

NEW USER WITH STATE SUBMIT

```
curl -X    T   ps://bankAPI.example/transaction
 -d client_id {CLIENT_ID}
 -d secre  { ECRET} \
 -d  ransac ion='{
   "withdrawal_account_token":"jasdlkfjio34i29",
   "deposit_account_token":"Bjsklaidf9djanjk",
   "amoun ":"515.15"}'
 -d  ype {TY  E}
```

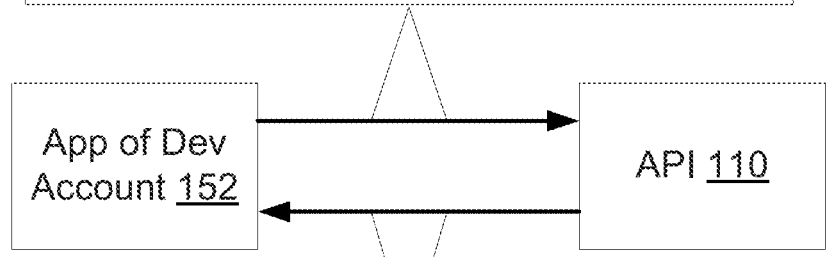

AUTH RESPONSE

```
  p code 200
{" ransac ion": [{
  "_id": "52db1be4be13cbXXXXXXXXXX",
  "s a us": "processing",
},
...], "transaction_access_ oken": "xxxxx"}
```

FIG. 8

Raw: {
    Details: "Electronic Deposit Pub Emp Ret Sys", — 1214
    Pending: false,
    DisplayAmount: 2,264.56 — 1210
    TransactionDate: 2015-01-30T00:00:00 — 1212
    TransactionID: 456 — 1208
} — 1206 / 1202

Raw: {
    Details: "Electronic Deposit Venmo",
    Pending: false,
    DisplayAmount: 136.00
    TransactionDate: 2015-02-05T00:00:00
    TransactionID: 457
}
    1204

FIG. 12

Probability = 0.05

|    | amount   | date_posted | clean_name |
|----|----------|-------------|------------|
| 43 | -350.00  | 2012-12-03  | DEPOSIT    |
| 44 | -600.00  | 2013-12-27  | DEPOSIT    |
| 42 | -500.00  | 2013-12-27  | DEPOSIT    |
| 40 | -694.10  | 2014-06-02  | DEPOSIT    |
| 39 | -397.50  | 2014-06-09  | DEPOSIT    |
| 37 | -401.31  | 2014-06-23  | DEPOSIT    |
| 35 | -373.51  | 2014-06-27  | DEPOSIT    |
| 33 | -616.67  | 2014-07-03  | DEPOSIT    |
| 34 | -110.00  | 2014-07-07  | DEPOSIT    |
| 31 | -253.78  | 2014-07-14  | DEPOSIT    |
| 32 | -368.44  | 2014-07-18  | DEPOSIT    |
| 30 | -6000.00 | 2014-07-21  | DEPOSIT    |
| 28 | -312.25  | 2014-07-25  | DEPOSIT    |
| 29 | -321.22  | 2014-08-01  | DEPOSIT    |
| 27 | -383.60  | 2014-08-11  | DEPOSIT    |
| 26 | -496.20  | 2014-08-15  | DEPOSIT    |
| 25 | -372.83  | 2014-08-22  | DEPOSIT    |
| 24 | -601.03  | 2014-08-29  | DEPOSIT    |
| 1  | -519.83  | 2014-09-05  | DEPOSIT    |
| 23 | -445.74  | 2014-09-12  | DEPOSIT    |

FIG. 13A

Probability = 0.47

| | amount | date_posted | clean_name |
|---|---|---|---|
| 120 | -2264.56 | 2015-01-30 | ELECTRONIC DEPOSIT |
| 122 | -136.00 | 2015-02-05 | ELECTRONIC DEPOSIT |
| 123 | -2177.86 | 2015-02-06 | ELECTRONIC DEPOSIT |
| 124 | -1449.80 | 2015-02-19 | ELECTRONIC DEPOSIT |
| 0 | -2264.56 | 2015-02-27 | ELECTRONIC DEPOSIT |

FIG. 13B

Probability = 0.85

| | amount | date_posted | clean_name |
|---|---|---|---|
| 21 | -370.29 | 2014-09-25 | ELECTRONIC DEPOSIT PEERLESS PRODUCT |
| 20 | -370.29 | 2014-10-02 | ELECTRONIC DEPOSIT PEERLESS PRODUCT |
| 19 | -513.93 | 2014-10-09 | ELECTRONIC DEPOSIT PEERLESS PRODUCT |
| 17 | -384.91 | 2014-10-16 | ELECTRONIC DEPOSIT PEERLESS PRODUCT |
| 16 | -372.46 | 2014-10-23 | ELECTRONIC DEPOSIT PEERLESS PRODUCT |
| 14 | -372.46 | 2014-10-30 | ELECTRONIC DEPOSIT PEERLESS PRODUCT |
| 13 | -366.14 | 2014-11-06 | ELECTRONIC DEPOSIT PEERLESS PRODUCT |
| 12 | -372.46 | 2014-11-13 | ELECTRONIC DEPOSIT PEERLESS PRODUCT |
| 10 | -353.60 | 2014-11-20 | ELECTRONIC DEPOSIT PEERLESS PRODUCT |
| 8 | -358.31 | 2014-11-26 | ELECTRONIC DEPOSIT PEERLESS PRODUCT |
| 7 | -385.51 | 2014-12-04 | ELECTRONIC DEPOSIT PEERLESS PRODUCT |
| 6 | -347.80 | 2014-12-11 | ELECTRONIC DEPOSIT PEERLESS PRODUCT |
| 5 | -546.37 | 2014-12-18 | ELECTRONIC DEPOSIT PEERLESS PRODUCT |
| 4 | -358.38 | 2014-12-24 | ELECTRONIC DEPOSIT PEERLESS PRODUCT |
| 2 | -389.62 | 2014-12-31 | ELECTRONIC DEPOSIT PEERLESS PRODUCT |
| 3 | -348.29 | 2015-01-08 | ELECTRONIC DEPOSIT PEERLESS PRODUCT |

FIG. 13C

```
{
income_streams:
[
{monthly_income: 680, confidence: 1.0, last_payment_date: 2014-11-25, name: ABC SERVICE CORP, days: 545,
first_payment_date: 2013-05-29},
{monthly_income: 1537, confidence: 1.0, last_payment_date: 2015-06-11, name: 123 SERVICE CORP, days: 140,
first_payment_date: 2015-01-22},
{monthly_income: 644, confidence: 1.0, last_payment_date: 2014-12-25, name: RETAIL CORP, days: 15,
first_payment_date: 2014-12-10},
{monthly_income: 1288, confidence: 0.9999642116169422, last_payment_date: 2013-08-20, name: UNEMP
BENEFITS, days: 57, first_payment_date: 2013-06-24},
{monthly_income: 644, confidence: 0.7457776916404049699, last_payment_date: 2014-08-18, name: UNEMP BENEFITS,
days: 47, first_payment_date: 2014-07-02},
{monthly_income: 4770, confidence: 0.9999847908185955, last_payment_date: 2015-07-01, name: TECHNOLOGY
CORP, days: 755, first_payment_date: 2013-06-06}
],
last_updated: 2015-10-30,
version: 1.1,
projected_yearly_income: 76749,
number_of_jobs: 6,
last_year_income: 71809,
projected_yearly_income_pre_tax: 108664,
max_number_of_overlapping_jobs: 3,
last_year_income_before_tax: 100986,
active_days: 767
}
```

1402 — (income_streams block)
1414
1408
1404
1406
1410
1412

FIG. 14

SYSTEMS AND METHODS FOR ESTIMATING PAST AND PROSPECTIVE ATTRIBUTE VALUES ASSOCIATED WITH A USER ACCOUNT

CROSS-REFERENCE TO RELATED APPLICATIONS

This application is a continuation of U.S. patent application Ser. No. 17/230,835, filed Apr. 14, 2021, which is a continuation of U.S. patent application Ser. No. 15/160,663, filed May 20, 2016 (now U.S. Pat. No. 10,984,468), which claims priority to Provisional Patent Application No. 62/275,726, filed Jan. 6, 2016, the contents of which are incorporated herein by reference in their entireties.

TECHNICAL FIELD

Embodiments of the present disclosure relate to systems and techniques for estimating past and prospective attribute values of a user based on user account data. More specifically, embodiments of the present disclosure relate to securely accessing user account information via proprietary APIs, securely retrieving user account transaction information associated with one or more user accounts, and analyzing the retrieved user account transaction information to estimate an attribute value associated with the user.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Users may grant access to their user accounts by providing credentials related to those accounts. Using the provided credentials, user account information may be retrieved from the accounts, and used to determine certain attribute values associated with the user. However, certain types of attributes are often difficult to estimate based upon user account data alone, and often require significant interaction on the part of the user (e.g., providing additional documentation or paperwork).

SUMMARY

The systems, methods, and devices described herein each have several aspects, no single one of which is solely responsible for its desirable attributes. Without limiting the scope of this disclosure, several non-limiting features will now be described briefly.

Embodiments of the present disclosure relate to systems and techniques for retrieving account information from one or more external user account systems, and using the retrieved account information to estimate an attribute value associated with the user and to project attribute values associated with future time periods.

Accordingly, in various embodiments, large amounts of data are automatically and dynamically retrieved and processed in response to application programming interface (API) requests and other user inputs, and the retrieved data is efficiently and compactly accessible to a customer or user also via normalized API responses from the system. The data is retrieved in an efficient way via instantiation of virtualized instances of mobile applications, for example. Thus, in some embodiments, the API interfaces described herein are more efficient as compared to previous interfaces in which data is not normalized and compactly and efficiently provided to the customer user in response to such requests. Advantageously, using the system, the customer or user may access data from multiple disparate data sources and/or systems, each of which may use a proprietary interface, in a standardized way.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The present disclosure describes various embodiments of interactive and dynamic user interfaces that are the result of significant development. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interface via the inputs described herein may provide an optimized display of, and interaction with, transaction and account data and may enable a customer user to more quickly and accurately access, navigate, assess, and digest the account data than previous systems.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various aspects and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as mentioned above, existing account and/or transaction data retrieval technology is limited in various ways (e.g., interfaces differ for each system or source, data is provided in different formats, etc.), and various embodiments of the disclosure provide significant improvements over such technology. Additionally, various embodiments of the present disclosure are inextricably tied to computer technology. In particular, various embodiments rely on receipt of computer-based API requests, accessing of transaction and/or other data via, e.g., virtualized instances of mobile applications, normalization of retrieved data, and responses to the requests via the API in a standardized way. Such features and others are intimately tied to, and enabled by, computer technology, and would not exist except for computer technology. For example, the API request and responses, and instantiation of virtualized instances of e.g., mobile applications, described below in reference to various embodiments, cannot reasonably be performed by humans alone, without the computer technology upon which they are implemented. Further, the implementation of the various embodiments of the present disclosure via computer technology enables many of the advantages described herein, including more efficient interaction with, various types of data.

According to an embodiment, a method for accessing an account and estimating a value for an attribute associated with an account of a user is disclosed, comprising: receiving a request for transaction data for a given time period associated with an account at an external user account system, wherein the request is in a normalized API format; converting the request from the normalized format to a format compatible with an API associated with the external user account system; querying the external user account system for transaction data associated with the account using the converted request; receiving, from the external user account system, data comprising a plurality of transactions associated with the user for the given time period, each transaction of the plurality of transactions being associated with at least a transaction amount, a transaction date, and a transaction name; categorizing the plurality of received transactions into one or more transaction groups, based at least in part upon transaction name; for a group of the one or more transaction groups: estimating a confidence value that the group is associated with the attribute, based at least in part upon a distribution of transaction amounts for the transactions of the group over a time period associated with the transaction group; and estimating an attribute value for the group, based at least in part upon the transaction amounts for the transactions of the transaction group; and predicting a value of the attribute for a future time period based at least in part upon the one or more transaction groups.

According to an aspect, the attribute corresponds to an income, the confidence value for a group indicates a confidence that the group corresponds to an income stream, the attribute value for the group corresponds to an income stream value associated with the group, and predicting a value of the attribute for a future time period comprises predicting an income associated with the user for the future time period.

According to another aspect, the method further comprises automatically cleaning the transaction names of the plurality of received transactions, wherein cleaning a transaction name comprises removing one or more recognized keywords from the transaction name.

According to yet another aspect, a transaction name for a transaction of the plurality of received transactions indicates a source of the transaction.

According to yet another aspect, categorizing the plurality of received transactions into one or more transaction groups is further based at least in part upon the transaction dates associated with the plurality of received transactions.

According to yet another aspect, an attribute value is estimated for a group only if the confidence value associated with the group meets a threshold amount.

According to yet another aspect, predicting an income for a future time period comprises identifying at least one of the transaction groups as an active income stream, wherein the income for the future time period is based at least in part upon an income stream amount of the active income stream.

According to yet another aspect, a transaction group is identified as an active income stream if a last transaction associated with the transaction group is within a threshold time period from a time the prediction is performed.

According to yet another aspect, predicting an income for a future time period further comprises identifying an income-altering event associated with the active income stream, wherein the income stream amount of the active income stream is based at least in part upon the income-altering event.

According to another embodiment, a computer system is disclosed comprising: one or more computer readable storage devices configured to store a plurality of computer executable instructions; and one or more hardware computer processors in communication with the one or more computer readable storage devices and configured to execute the plurality of computer executable instructions in order to cause the computer system to: receive a request for transaction data for a given time period associated with an account at an external user account system, wherein the request is in a normalized API format; convert the request from the normalized format to a format compatible with an API associated with the external user account system; query the external user account system for transaction data associated with the account using the converted request; receive, from the external user account system, data comprising a plurality of transactions associated with the user for the given time period, each transaction of the plurality of transactions being associated with at least a transaction amount, a transaction date, and a transaction name; categorize the plurality of received transactions into one or more transaction groups, based at least in part upon transaction name; for a group of the one or more transaction groups: estimate a confidence value that the group is associated with the attribute, based at least in part upon a distribution of transaction amounts for the transactions of the group over a time period associated with the transaction group; and estimate an attribute value for the group, based at least in part upon the transaction amounts for the transactions of the transaction group; and predict a value of the attribute for a future time period based at least in part upon the one or more transaction groups.

According to another embodiment, a non-transitory computer-readable medium storing software instructions is disclosed that, in response to execution by one or more hardware computer processors, configure the one or more hardware computer processors to perform operations comprising: receiving a request for transaction data for a given time period associated with an account at an external user account system, wherein the request is in a normalized API format; converting the request from the normalized format to a format compatible with an API associated with the external user account system; querying the external user account system for transaction data associated with the account using the converted request; receiving, from the external user account system, data comprising a plurality of transactions associated with the user for the given time period, each transaction of the plurality of transactions being associated with at least a transaction amount, a transaction date, and a transaction name; categorizing the plurality of received transactions into one or more transaction groups, based at least in part upon transaction name; for a group of the one or more transaction groups: estimating a confidence value that the group is associated with the attribute, based at least in part upon a distribution of transaction amounts for the transactions of the group over a time period associated with the transaction group; and estimating an attribute value for the group, based at least in part upon the transaction amounts for the transactions of the transaction group; and predicting a value of the attribute for a future time period based at least in part upon the one or more transaction groups.

Additional embodiments of the disclosure are described below in reference to the appended claims, which may serve as an additional summary of the disclosure.

In various embodiments, computer systems are disclosed that comprise one or more hardware computer processors in communication with one or more non-transitory computer readable storage devices, wherein the one or more hardware computer processors are configured to execute the plurality of computer executable instructions in order to cause the computer system to operations comprising one or more aspects of the above-described embodiments (including one or more aspects of the appended claims).

In various embodiments, computer-implemented methods are disclosed in which, under control of one or more hardware computing devices configured with specific computer executable instructions, one or more aspects of the above-described embodiments (including one or more aspects of the appended claims) are implemented and/or performed.

In various embodiments, non-transitory computer-readable storage mediums storing software instructions are disclosed, wherein, in response to execution by a computing system having one or more hardware processors, the software instructions configure the computing system to perform operations comprising one or more aspects of the above-described embodiments (including one or more aspects of the appended claims).

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIG. 2 illustrates aspects of some example proxy instances, according to an embodiment;

FIG. 4B illustrates aspects of some example proxy instances, according to an embodiment;

FIGS. 7-8 illustrate examples of API request and response flows of the system, according to an embodiment;

FIG. 12 illustrates example raw transaction data that may be received from an account endpoint, according to various embodiments.

FIGS. 13A-13C illustrate examples of transaction groups analyzed as potential income streams, according to various embodiments.

FIG. 14 illustrates example summary data that may be generated for an account in some embodiments, according to various embodiments.

DETAILED DESCRIPTION

Figure 1:
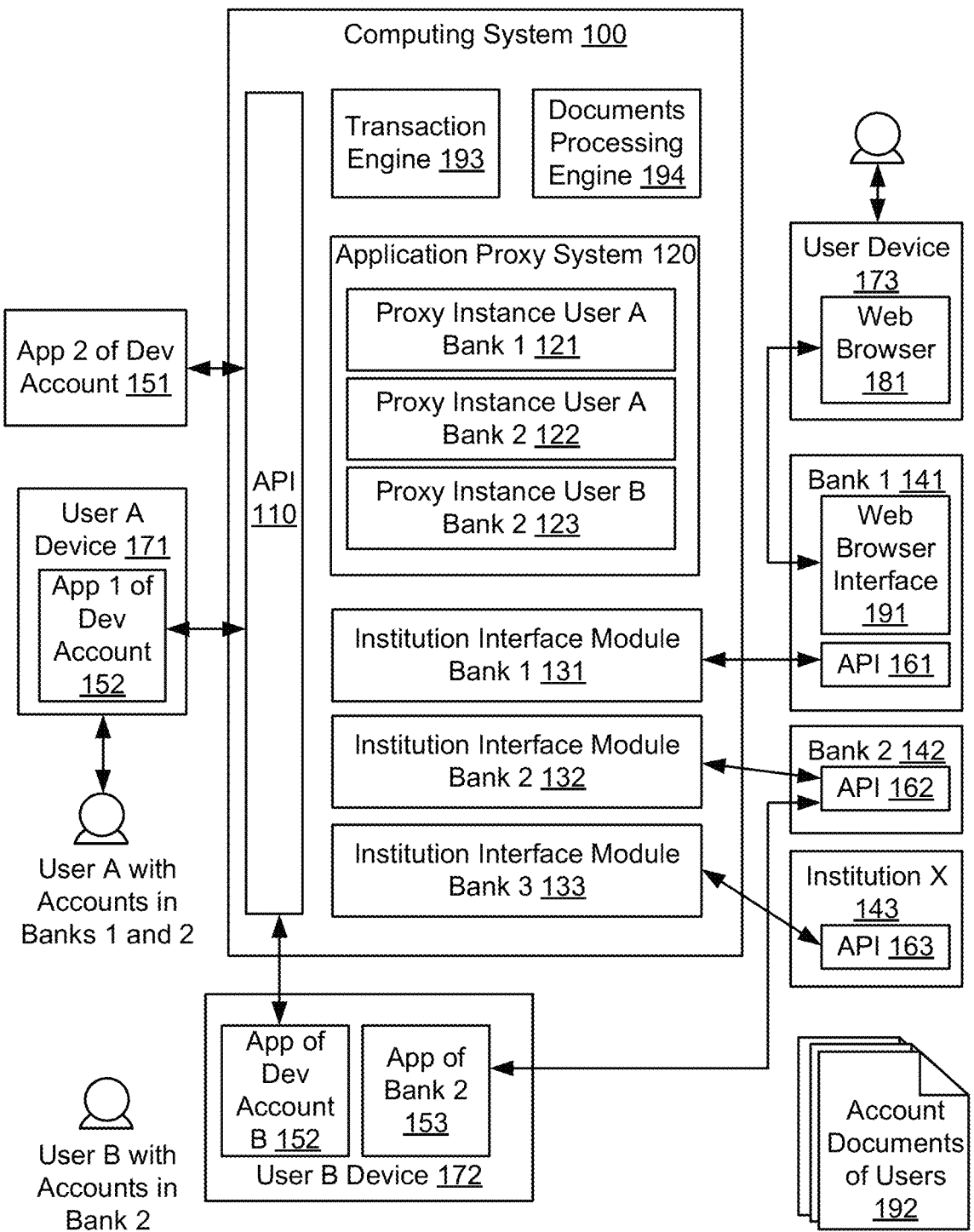
FIG. 1 is a block diagram illustrating various aspects of a computing system and network environment in which the computing system may be implemented, according to an embodiment.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Overview

As mentioned above, according to various embodiments systems are disclosed estimating attribute values of a user using user account information associated with the user. In some embodiments, the estimated attribute values may be used to determine prospective attributes values associated with the user for future time periods.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

Definitions

In order to facilitate an understanding of the systems and methods discussed herein, a number of terms are defined below. The terms defined below, as well as other terms used herein, should be construed broadly to include the provided definitions, the ordinary and customary meaning of the terms, and/or any other implied meaning for the respective terms. Thus, the definitions below do not limit the meaning of these terms, but only provide example definitions.

User Account Data Accessing System (also variously referred to herein as "the system" or "the permissions management system"): A computing system, the functionality of which is described in detail in the present disclosure. Functions of the user account data accessing system (which are described in further detail below) include, but are not limited to: accessing and/or extracting user account data from external user account systems; initiating execution of, or executing, transactions via external user account systems; generating secure tokens based on user account data; enabling permissioning of access to, and execution of transactions on, user accounts on the user account systems; enabling revocation of permissions for, or de-authorization of, access to user accounts on the user account systems; and/or enabling revocation of permissions for, or de-authorization of, rights to execute transactions via user accounts on the user account systems. One or more of these functionalities may be implemented via the user account data accessing system, as described below, and may be accessible to customers via a standardized application programming interface (API). Accordingly, a customer may access any of the functionality of the user account data accessing system (including, e.g., accessing user account data, permissioning access to user account data, etc.), via the standardized application programming interface (API). The user account data accessing system may be referred to herein simply as "the system," and various aspects and implementations of the system are described herein in reference to the various figures. As some aspects of the system, in some implementations, include management of permissions associated with user accounts, the system may also be referred to herein as "the permissions management system."

External User Account System: A computing system or service of an external institution. For ease of description, general references herein to external institutions (or more simply "institutions") may be understood to refer to the external user account systems of those institutions. Accordingly, external user account systems may also be referred to herein as "external institution system," "external bank systems," "bank systems," "banks," "institutions," "external services," and/or the like. As described below, external user account systems may provide non-public and/or proprietary application programming interfaces (APIs) by which user account data may be accessed by first-party software applications (e.g., mobile device software applications) of the external institutions. However, as further described below, the system of the present disclosure may enable access to user account data via such non-public and/or proprietary APIs of the external user account systems by, e.g., instantiating virtual and/or proxy instances of the first-party software applications of the external institutions.

External Institution: An entity that maintains a user account. Examples of external institutions (also referred to herein as "institutions") include, but are not limited to, banks, credit card providers, investment services, loan providers, and/or other suitable financial institutions or user account holding institutions.

Application Programming Interface (API): A set of routines, protocols, and/or tools for building a software application. Generally an API defines a standardized set of operations, inputs, outputs, and underlying types, such that functionality is accessible via the API in an efficient way. The system provides an API by which a customer may access any of the functionality of the system, as described herein. Accordingly, the system advantageously abstracts away (from a customer's perspective), much of the complexity that may be involved in the functionality of the system, and enables the customer to quickly and efficiently leverage the functionality of the system to build other systems and services.

Customer: One who makes use of the API of the system to access functionality of the system in a software application of the customer, as described herein. Customers of the system may include, but are not limited to, software developers (who may be developing, e.g., a software application such as a store, or mobile app), third-party processors (e.g., third-party payment processors), external institutions, merchants, and/or the like.

External User-Facing System/Application: A software application and/or computing system of a customer (e.g., developed by a customer) that interacts with the system via the API of the system. Examples of external user-facing systems/applications include, but are not limited to, desktop software applications, mobile device software applications, server software applications, and/or the like. In general, external user-facing systems/applications provide goods or services to a user. In some instances, for ease of description, such software applications may be referred to herein as "apps."

Third-Party Processor: An entity that processes transactions, e.g., financial transactions for a merchant. When provided with account information (e.g., credit card information, bank account information, etc.) and payment information (e.g., how much to pay, to whom, and when, etc.), executes and processes a transaction. In some implementations, the system may interact with a third-party processor system to execute and/or process payments. Alternatively, the system may include functionality to process transactions, and thus may effectively act as its own "third-party" processor (thus, "third-party" is somewhat of a misnomer in this context, but the term "third-party" is used in the present disclosure for clarity purposes).

User: A holder of a user account at an external institution. In general, a user maintains account credentials for accessing their user account, and provides authorizations and/or de-authorizations for an external user-facing system/application of a customer (e.g., an "app" of a developer) to limitedly and securely access the user account (e.g., to initiate payments for goods or services). Such authorizations and/or de-authorizations (among other functionality) are enabled by the system and via the API of the system, as described herein. Advantageously, the user's account credentials are never accessible to the external user-facing system/application. Rather, the system securely enables the user to authorizations and/or de-authorizations, without revealing the account credentials outside of the system (and/or trusted entities of the system, such as a trusted third-party processor).

User Input: Also referred to herein simply as "input." As used herein in reference to user/customer interactions with a computing system, "user input" is a broad term that refers to any type of input provided by a user/customer that is intended to be received and/or stored by the system, to cause an update to data that is displayed and/or stored by the system, to cause an update to the way that data is displayed and/or stored by the system, and/or the like. Non-limiting examples of such user inputs include keyboard inputs, mouse inputs, digital pen inputs, voice inputs, finger touch inputs (e.g., via touch sensitive display), gesture inputs (e.g., hand movements, finger movements, arm movements, movements of any other appendage, and/or body movements), and/or the like. Additionally, user inputs to the system may include inputs via tools and/or other objects manipulated by the user. For example, the user may move an object, such as a tool, stylus, or wand, to provide inputs. Further, user inputs may include motion, position, rotation, angle, alignment, orientation, configuration (e.g., fist, hand flat, one finger extended, etc.), and/or the like. For example, user inputs may comprise a position, orientation, and/or motion of a hand and/or a 3D mouse.

Database: A broad term for any data store or data structure (and/or combination of multiple data stores and/or data structures) for storing and/or organizing data, including, but not limited to, relational databases (e.g., Oracle databases, mySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. The various terms "database," "storage," "data store," "data source," and/or the like may be used interchangeably in the present disclosure.

Example Systems and Methods for Programmatically Accessing User Account Data

FIG. 1 illustrates certain aspects of a computing system 100 (e.g., the system) that may access user account data from one or more external user account systems. The system 100 may include an application programming interface (API) service 110, an application proxy system 120, and at least one institution interface module (e.g., modules 131, 132, and 133). The system functions to provide programmatic access to one or more external user account systems (e.g., external user account systems 141, 142, and 143) that lack exposed programmatic access. The external user account systems may comprise proprietary and external financial services (e.g., financial institution services, among others, as described above). Such institutions may have first party software applications (e.g., mobile applications) that enable users to access user account data/information from a mobile or desktop device. Such first party applications commonly use proprietary or customized application programming interfaces (API) (e.g., APIs 161, 162, and 163). These APIs are commonly not public and not exposed. For example, a developer is commonly prevented from registering an account and using an open API authentication approach to arbitrarily access the API resources of such external user account systems. Additionally, the APIs (e.g., APIs 161, 162, and 163) of the external user account systems are a non-trivial customized interface protocols that may not be shared with other institutions; e.g., each external user account system conforms to its own interface.

The system 100 functions to provide a normalized interface (e.g., API service 110) to the one or more external user account systems (e.g., external user account systems 141, 142, and 143). The system 100 enables access to a user account within an external user account system by leveraging the application proxy system 120. A virtualized "image" or digital simulation of an application instance is maintained in the application proxy system 120 and used to access the unexposed API (e.g., APIs 161, 162, and 163) of the external user account system. While the system may be applied to financial institutions, the system may additionally or alternatively be applied to providing API access to other external systems with closed or limited API access.

The API 110 of the system functions to provide a normalized customer facing interface. The API 110 may be normalized in the sense that the underlying non-public API to the external user account system (e.g., external user account systems 141, 142, and 143) that acts as the source of the user account data is abstracted away, and the API 110 to various different external user account systems is substantially standardized. In some variations, various aspects of the API 110 may be limited when interfacing with external user account systems. For example, one institution may not support a feature such as digital check deposit, while a second institution does. In this case, the API 110 may define the API such that the API feature for check deposit is prevented for the first institution. The system 100, and more specifically the API 110, may be used to provide an accessible API service to customers, e.g., outside developers. As such, the system 100 is may be a multi-tenant system that allows numerous accounts to share use of the system 100. The system 100 and more particularly the API 110 may alternatively be a single tenant system. For example, the system may be used as an internal system to a website providing an online financial management product.

The API service 110 may be a RESTful API, but may alternatively be any suitable API such as SOAP or custom protocol. The RESTful API works according to an HTTP request and response model. HTTP requests (or any suitable request communication) to the system 100 may observe the principles of a RESTful design. RESTful is understood in this document to describe a Representational State Transfer architecture as is known in the art. The RESTful HTTP requests may be stateless, thus each message communicated contains all necessary information for processing the request and generating a response. The API service 110 can include various resources which act as endpoints which act as a mechanism for specifying requested information or requesting particular actions. The resources can be expressed as URI's or resource paths. The RESTful API resources can additionally be responsive to different types of HTTP methods such as GET, PUT, POST and/or DELETE.

The API service 110 can provide an interface into a variety of information and action resources, as provided by the system 100. Information/data relating to a user account may be accessible through querying particular API resources via the API 110. For example, a list of transactions and information about each individual transaction may be accessible through different API calls of the API 110. Information can additionally relate to account summary information, account details such as address and contact information, information about other parties such as the entities involved in a transaction, and/or any suitable information. The API 110 may additionally be used to trigger or facilitate performing some action. For example, an API call may be used in transferring money, updating account information, setting up alerts, or performing any suitable action. Those skilled in the art will appreciate that such example API features that any suitable API feature possibilities and semantic architecture may be used.

In one example implementation, an API call via the API 110 can support adding a user, completing authentication, accessing transaction information, and other actions. For example, an application may POST to a "/connect" REST API resource of the API 110 to authenticate a user; if an institution includes multi-factor authentication, then a "/connect/step" resource can be submitted to complete multi-factor authentication credentials; and then performing a GET on the "/connect" resource can access transactional data related to the user/user's account. The API 110 may additionally include informational resources to access information about entities involved in transactions. For example, the API 110 may allow a particular business resource to be accessed to obtain contextual information about the business such as name, location, and classification.

The application proxy system 120 functions to manage a simulation of a first-party software application access to an institution. The application proxy system 120 operates in cooperation with one or more institution interface modules (e.g., institution interface modules 131, 132, and 133) to establish a data model and/or a data image that acts as a virtualized application instance (also referred to herein as an "application proxy instance," "proxy instance," "virtualized instance," and/or the like) (e.g., proxy instances 121, 122, and 123). From the perspective of the institution, the proxy instance (e.g., proxy instances 121, 122, and 123) appears as a first-party application (e.g., Bank 2 application 153) installed on a physical user device (e.g., user devices 171 and 172) that is being used by a user. In other words, the requests received from the proxy instance are treated like requests from a first-party mobile app, desktop app, or web-based application of the user. The application proxy system 120 may store and maintain a plurality of application proxy instances (e.g., proxy instances 121, 122, and 123). The proxy instances may include configuration settings and properties that, when used according to a defined institution interface (e.g., an institution interface of an institution interface module 131, 132, and/or 133), will appear as requests from first-party applications (e.g., application 153) of the institution (e.g., institution 141, 142, and/or 143). A different proxy instance may be created and maintained for each user account-institution pair. A given user may have multiple user accounts with different institutions. A proxy instance may include a set of properties that can be used to authenticate the proxy instance with the institution system (e.g., institution 141, 142, and/or 143). The API service 120 provides a method to programmatically create a proxy instance for a user. The user may provide some account credentials that can be used in an initial registration of the proxy instance with the non-public API of the institution. The proxy instance may be characterized as a set of properties that can be stored and maintained. Some of those properties may be automatically generated, may be provided from the institution during negotiating registration, may be properties of the application that is being simulated, and/or may include any suitable identifying and authenticating information. The properties may include a unique user identifier code, an authentication token, a MAC address (e.g., a MAC address of a user device 171 or 172), or any suitable information. When a request is made to a bank on behalf of a user, the properties of the proxy instance may be invoked to gain access to the institution on behalf of the associated user.

FIG. 2 depicts example proxy instances 121, 122, and 123 of FIG. 1. As shown in FIG. 2, User A has accounts in Bank 1 and Bank 2, and User B has accounts in Bank 2. As shown in FIG. 2, each proxy instance includes account credentials and properties.

An institution interface modules (e.g., one of institution interface modules 131, 132, or 133) functions to model the internal interface (e.g., interaction with one of APIs 161, 162, or 163) of at least one application (e.g., the application 153) with an external institution (e.g., one of institutions 141, 142, or 143). An institution interface module may be established for each institution with which the system 100 can interface. For example, an institution interface module may exist for each bank and/or credit card company that is available in the system. The institution interface module may include a set of rules and processes of a particular institution. The institution interface module may include a proxy sub-module that defines how the institution recognizes and/or authenticates a particular application. Some banks may depend on the MAC address of a device (e.g., a MAC address of user devices 171 and/or 172), some may depend on asymmetric cryptography tokens, and others may generate encrypted tokens. The proxy sub-module is used in establishing the proxy instance information. The institution interface module can additionally include institution protocol sub-module, which defines a mapping between provided API 110 functionality and the form and mode of communication with the external institution (e.g., institutions 141, 142, or 143). The institution protocol sub-module can define the headers, body, and other properties of messages sent to the associated institution. The protocol sub-module may additionally define how data should be processed to form that message. In some cases, the data may be encrypted in a standard or proprietary format, which the protocol sub-module can define. Additionally, the protocol sub-module can define the communication flow to fulfill a request. In some cases, multiple requests may need to be made to complete a request objective. Other aspects of interacting with an interface (e.g., APIs 161, 162, and/or 163) of an external institution (e.g., institutions 141, 142, and/or 143) may additionally be built into the institution interface module such as multi-factor authentication rules.

An institution interface module may be constructed based on use of an actual first-party application (e.g., the application 153). For example, communication of, and/or source code of, the first-party application can be parsed and analyzed to establish some or all of an institution interface module. In some implementations, source code of a first-party application (e.g., the application 153) of an external institution is parsed and analyzed to establish some or all of an institution interface module for the external institution. In some implementations, communication between an external institution and a first-party application (e.g. the application 153) of the external institution is parsed and analyzed to establish some or all of an institution interface module for the external institution.

Figure 3:
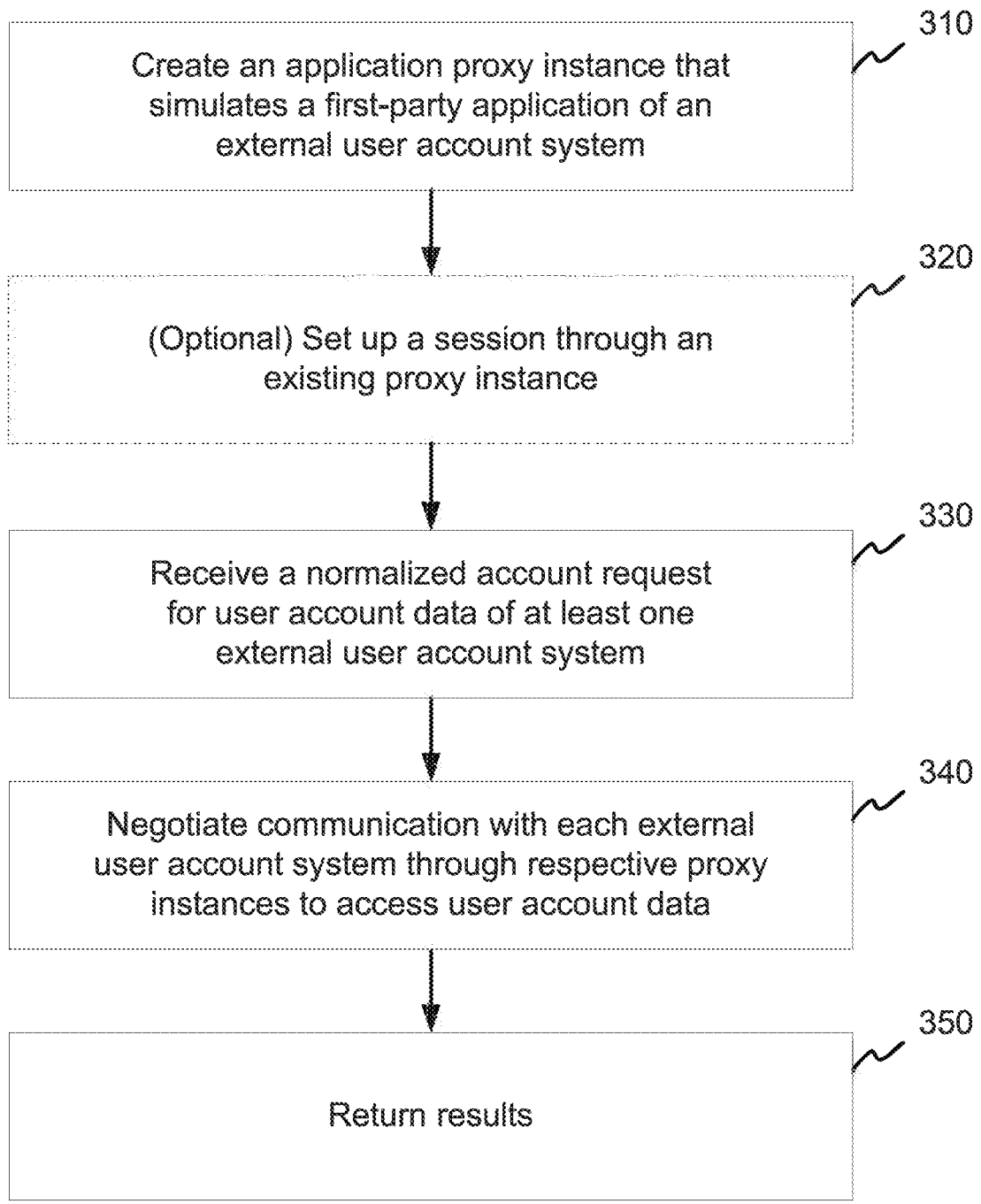
FIG. 3 is a flowchart illustrating an example method of accessing user account data, according to an embodiment.

FIG. 3 is a flowchart illustrating an example method of accessing user account data, according to an embodiment. As shown in FIG. 3, the method can include creating an application proxy instance (block 310), optionally setting up a communication session through the proxy instance (block 320), receiving a normalized account request (block 330), negotiating communication with an external interface through a proxy instance (block 340), and returning results (block 350). The method functions to provide programmatic access to one or more external services (e.g., external user account systems of external institutions) that lack exposed programmatic access. The external services may be proprietary and/or non-public. The external services can be provided by external institutions, as described above. Such institutions may have first-party applications that enable users to access user account information via a mobile or desktop application. Such first-party applications may use a proprietary or customized API (e.g., API 161, 162, and/or 163) of the external institution. Such APIs are commonly not public and not exposed. For example, a developer is commonly prevented from registering an account and using an open API authentication approach to arbitrarily access the API resources of external institutions. Additionally, such APIs are non-trivial customized interface protocols that are not shared with other institutions, e.g., each institution conforms to its own interface. The method can additionally provide a normalized interface to a plurality of external services (e.g., external institutions 141, 142, and/or 143). The method enables a programmatic interface into an account within an institution by leveraging an application proxy approach. A virtualized "image" or digital simulation of an application instance is maintained in the application proxy system 120 and used to access the unexposed API (e.g., API 161, 162, and/or 163) of the institution. While the system 100 may be applied to financial institutions, the system 100 may additionally or alternatively be applied to providing API access to any other external entities with closed or limited API access. The method may be implemented through the system 100 as described above, but may alternatively be implemented by any suitable system.

At block 310, which includes creating an application proxy instance (e.g., an application proxy instance 121, 122, and/or 123), the system 100 functions to establish a digital image of a first-party application instance (e.g., the application instance 1431) for a selected institution (e.g., the Bank 2 142). Creating an application proxy instances may be initiated in response to receiving an initial request. The initial request may be initiated by a user (or entity) (e.g., User A or User B) interacting with an external user-facing system/application (e.g., application instances 151 and/or 152, executing on either of user devices 171 or 172 and/or another suitable device, and/or further executing on another system of the application instances 151, 152) of a customer (e.g., a developer). The external user-facing system/application may then send the initial request to the system 100. The user (e.g., User A and/or User B) may have a user account with the external institution (e.g., an online bank account). An application proxy instance (e.g., one of proxy instances 121, 122, and/or 123) can be created during the initial registration or at a later time, which will provide access to account information of the external institution. Once created, the application proxy instance of that user can be persisted and used at a later time for that given user-institution combination (e.g., "User A-Bank 1", "User A-Bank 2", "User B-Bank 2"). However, a new proxy instance may be created when the proxy instance becomes invalid (e.g., as a result of institution API changes, password/login changes made within the institution, and/or other changes to invalidate a proxy instance). The initial request may be received through a normalized API (e.g., API 110) as a connection request. The connection request may be accompanied by parameters that specify a selected institution (if there are multiple institution options) and user credentials for the institution. The user credentials may include a username, password, pin code, and/or any suitable credentials. The API request may additionally include authentication credentials such as a client identifier and secret token that is associated with the account in the system.

Creating a proxy instance may include negotiating registration of the proxy instance with the institution, which functions to establish the proxy instance with the selected external institution. An institution interface module (e.g., one of the modules 131, 132, or 133) may facilitate navigating the communication handshaking during the initial login. Different institutions may have different processes to register or enroll a new application (which in the method is a proxy instance) such as multi-factor authentication. During the negotiation, various elements may be extracted and stored as part of the proxy instance. Similarly, some properties may be generated based on communication with the institution. For example, a MAC address or a unique device identifier may be used in connecting to the services of the external institution. Such properties may be stored as part of the proxy instance.

As mentioned above, multifactor authentication (MFA) may be part of negotiating with an external institution. For example, an external institution may respond with indication of a MFA credential requirement. Such MFA requirements may be fulfilled by relaying the MFA challenge/task up to a user. In one implementation, the system 100 receives a message indicating that a security question should be asked to complete the negotiation. The security question is passed back to the associated application (e.g., applications 151 and/or 152, which may be operated by a customer/developer account of the system 100). Then, the associated application may present the security question in some manner to obtain the user response. The MFA can include security questions, additional pin codes (such as those supplied by a one-time password generator or a code transmitted to a secondary device), or any suitable form of MFA.

At block 330, the system receives a normalized account request via the API 110 of the system 100. As mentioned above, the syntax and mode of communicating an API request is normalized such that the format is independent of the institution. The requests can include a variety of types of requests which may include: obtaining a list of transactions; requesting details on a particular transaction; performing some financial transfer (moving money from savings to checking, setting up transfer to another account, making scheduled payments, digital deposit of a check, and/or the like), updating account information (e.g., updating contact information, changing password, manage alerts, and/or the like), requesting services (e.g., new cards, reporting fraud, and/or the like), and/or the like. A normalized account request may be mapped to an institution interface module (e.g., one of the institution interface modules 131, 132, or 133) or other suitable component that defines communication to fulfill the API request.

At block 340, which includes negotiating communication with an external interface (e.g., one of APIs 161, 162, and/or 163) through a proxy instance (e.g., one of the proxy instances 121, 122, and/or 123), the system 100 functions to execute and manage communication between the system and an external institution system (e.g., one of systems 141, 142, and/or 143) when fulfilling an account request. The proxy instance (e.g., one of the proxy instances 121, 122, and/or 123) provides a mechanism through which access may be granted. The communication is executed while an authenticated session is active. Communication sessions may be expired by the system 100 or the external institution for various reasons, such as remaining inactive for a set amount of time. A communication session may be active subsequent to enrolling a proxy instance or may require setting up a session through the proxy instance as described below.

Negotiating communication may include creating requests that conform to expected messages of the external institution. This can include setting headers, body contents, and other message properties. An institution may expect particular headers. For example, the headers may include a host or path, a data, content type, cookies, MAC address, a user identifier, auth properties, and/or other suitable headers. Creating requests can additionally include transforming request properties into an expected form, which may include applying a set encryption pattern to a request. In one variation, transforming the request involves encrypting content according to a public key, wherein the public key may be stored as part of the proxy instance. The institutions may take varying approaches to how information is communicated. In an alternative institution, the contents of a message may be unencrypted, in which case, the contents may be submitted in a plaintext, unencrypted form. In addition to creating requests that conform to expected messages of the external institution, the method can include following a request-response pattern. That pattern can involve a single request and response, but may alternatively include a sequence of different request and responses to obtain desired information.

In some variations, information or actions may not be available through the first proxy instance and so the method may include automatically switching to a second proxy instance with supported functionality. For example, full bank statements may not be available in a mobile application, and the institution API (e.g., one of APIs 161, 162, and/or 163) may not include such functionality. Accordingly, when that functionality is required to fulfill an API request of the API 110, then a second proxy interface may be used. In some variations, an API request via the API 110 may require multiple institutions to be queried. Such an API request may be particularly useful for summarizing financial statements across multiple accounts. The method can include negotiating communication for multiple institutions and combining results into a combined form.

At block 350, which includes returning results, the system 100 functions to deliver the results as a response to the request. Returning the results includes transforming the data obtained from the external institution into a normalized form. The information is formatted into a standardized format that is substantially similar in representation between different institutions served by the system 100. Transforming the data can additionally include processing, supplementing, and/or otherwise enhancing information. Some information provided by an institution may be poorly formed. For example, store information for a particular transaction may be poorly labeled and may be represented different from other institutions. Such contextual information about external entities can be cleaned and/or supplemented with additional information. For example, an entity may be supplemented with categorical labels, tags, geolocation information, and/or other suitable information. The returned results can be represented data format such as JSON, XML, or any suitable format.

The method can additionally optionally include block 320, which includes setting up a session through a proxy instance that was previously created, and functions to facilitate accessing information after negotiating a proxy instance for an account and institution. The proxy instance may store and maintain information required for subsequent access. The external institutions may restrict access to set sessions, which may expire after some amount of time or may require reconfirming user credentials. Thus, when an API request for an account occurs after a communication session has expired, then the method may automatically set up a new session using the previous user credentials and proxy instance credentials. In some variations, MFA challenges, such as security questions, may be automatically completed.

The method can additionally include re-capturing updated credentials, which functions to update user credentials for an institution. Updated credentials may be updated when a user changes them within the institution or when the proxy instance is otherwise locked out of the account. An error may occur indicating that a communication session was not successful, and then an API request can be submitted to update a proxy instance with new credentials.

Referring again to FIG. 1, in some implementations external user account system of the external institutions may include public web browser interfaces. For example, as shown in FIG. 1, the bank 1 system 141 may include a web browser interface 191 for accessing the bank 1 system 141 via a web browser (or any suitable web client) (e.g., web browser 181 of the user device 473). As described herein and further below in reference to FIGS. 6 and 7, the system 100 provides access to the user account data via private, proprietary APIs (e.g., API 161) of external institutions, as opposed to access via a public web browser interface 191. In some implementations, the web browser interface 191 is a web server that hosts a web site for access of the external institution system via a web browser over the Internet.

Figure 4A:
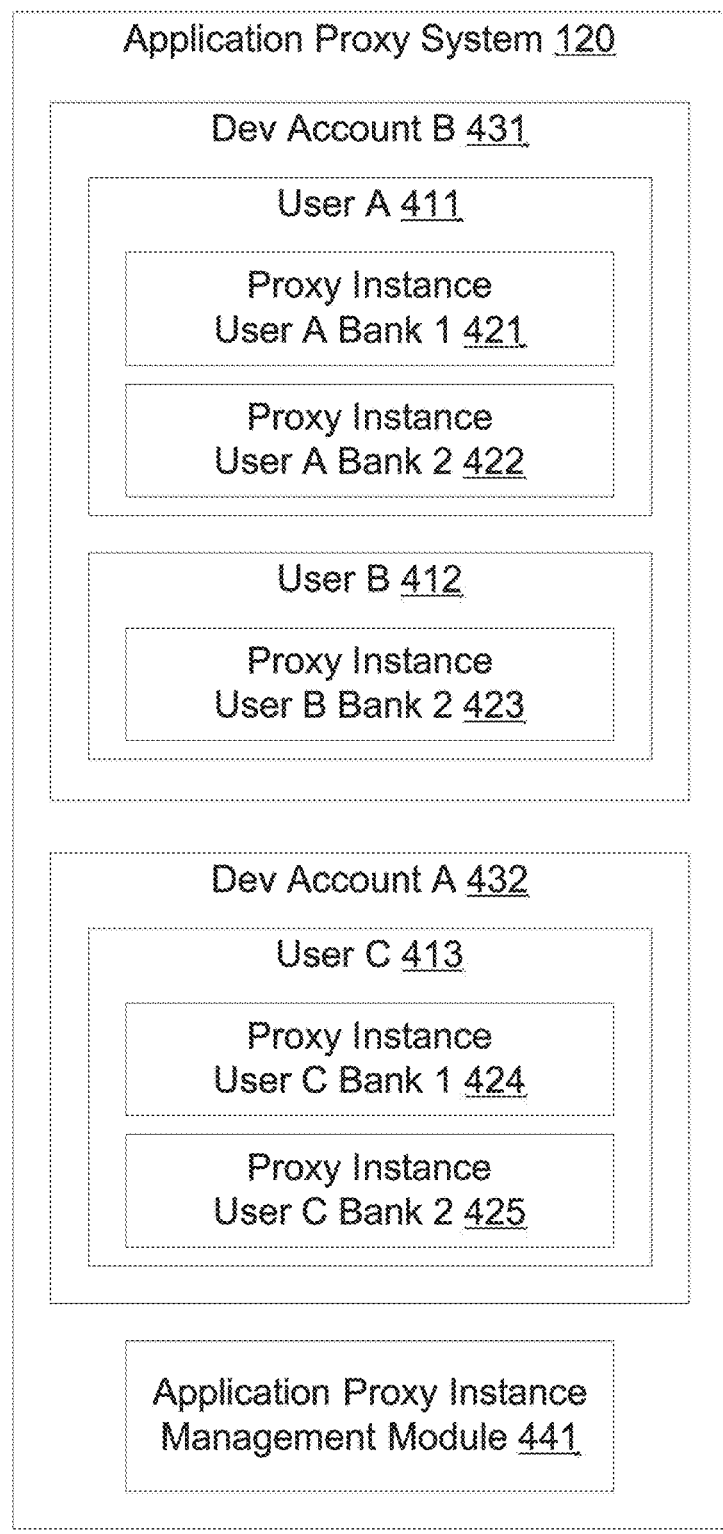
FIG. 4A illustrates aspects of an application proxy system, according to an embodiment.

FIG. 4A illustrates aspects of the application proxy system 120, according to an embodiment. As shown in FIG. 4A, the application proxy system 120 includes application proxy instances (e.g., proxy instances 421, 422, 423, 424, and 425) for user accounts (e.g., user accounts 411, 412 and 413) of developer accounts (e.g., Dev Account B 431 and Dev Account A 432) at the system 100. The application proxy system 120 includes an application proxy instance management module 441 that is constructed to generate application proxy instances, configure application proxy instances, remove application proxy instances, and/or the like.

In some implementations, each application proxy instance (e.g., proxy instances 421, 422, 423, 424, and/or 425), specifies a developer account, a user account of the developer account, an associated external user account system (e.g., an external institution), and credentials of the user account for the external institution, as shown in FIG. 4B. In some implementations, each application proxy instance specifies properties of the application proxy instance. In some implementations, properties include one or more of a unique user identifier code, an authentication token, a MAC address (e.g., a MAC address of a user device 171 and/or 172), or any suitable information.

In some implementations, the application proxy instance management module 441 creates the application proxy instance responsive to a request to create an application proxy instance. In some implementations, the request to create an application proxy instance specifies information identifying an external user account system, and a user account of an external user-facing system/application (e.g., a user account of the external user-facing system/application 152 of FIG. 1). In some implementations, the request to create an application proxy instance specifies user credentials for the external user account system. In some implementations, the request to create an application proxy instance specifies information identifying an account of the system 100 associated with the external user-facing systems/application. In some implementations, the request to create an application proxy instance specifies properties for the application proxy instance. In some implementations, properties for the application proxy instance include at least one of a unique user identifier code, an authentication token, a MAC address, user accounts of the corresponding external user account system, and/or any other suitable information.

In some implementations, the application proxy instance management module 441 stores the created application proxy instance in association with a user account (e.g., "User A" 411 of FIGS. 4A and 4B) of an external user-facing system/application (e.g., a user account of the external user-facing system/application 152 of FIG. 1). In some implementations, the application proxy instance management module 441 stores the created application proxy instance in association with an account (e.g., "Dev Account B" 431 of FIGS. 4A and 4B) of the system 100 associated with an external user-facing system/application (e.g., a user account of the external user-facing system/application 152 of FIG. 1). In some implementations, the application proxy instance management module 441 stores the created application proxy instance (e.g., "Proxy Instance User A Bank 1" 421 of FIGS. 4A and 4B) in association with an account (e.g., "Dev Account B" 431) of the system 100 associated with an external user-facing systems/application, and a user account (e.g., "User A" 411) of the external user-facing systems/application. In some implementations, the application proxy instance management module 441 stores the created application proxy instance in association with an account of the system 100 associated with an external user-facing systems/application, a user account of the external user-facing systems/application, and information identifying the external user account system (e.g., "Bank 1 141" of FIG. 4B) of the application proxy instance. In some implementations, the application proxy instance management module 441 stores the created application proxy instance in association with an account of the system 100 associated with an external user-facing systems/application, a user account of the external user-facing systems/application, information identifying the external user account system of the application proxy instance, and information identifying user accounts of the application proxy instance.

In some implementations, creating the application proxy instance includes controlling the application proxy instance management module 441 to construct the application proxy instance to simulate communication, register, negotiate registration, and/or the like, of an application (e.g., application 153 of FIG. 1) (of the external user account system of the application proxy instance) with the external user account system on behalf of the user account (e.g., "User A", "User B") of the application system.

Additional examples and details of accessing user account data via proxy instances of the system may be found in U.S. patent application Ser. No. 14/790,840, filed Jul. 2, 2015, and titled "SYSTEM AND METHOD FOR PROGRAMMATICALLY ACCESSING FINANCIAL DATA" (referred to herein as "the '840 application"). The entire disclosure of this application is hereby made part of this specification as if set forth fully herein and incorporated by reference for all purposes, for all that it contains.

As mentioned above, the system 100 may also be used, via the API 110, to access various types of user account data, including documents (such as statements). The system 100 may also be used, via the API 110, to initiate transactions (such as a transfer of funds between accounts, schedule payments, etc.). The system 100 may also be used, via the API 110, to update account information or request services. Additional examples and details of such functionality of the system is provided below, and may also be found in the '840 application.

Example Systems and Methods for Programmatically Verifying Transactions

Figure 5:
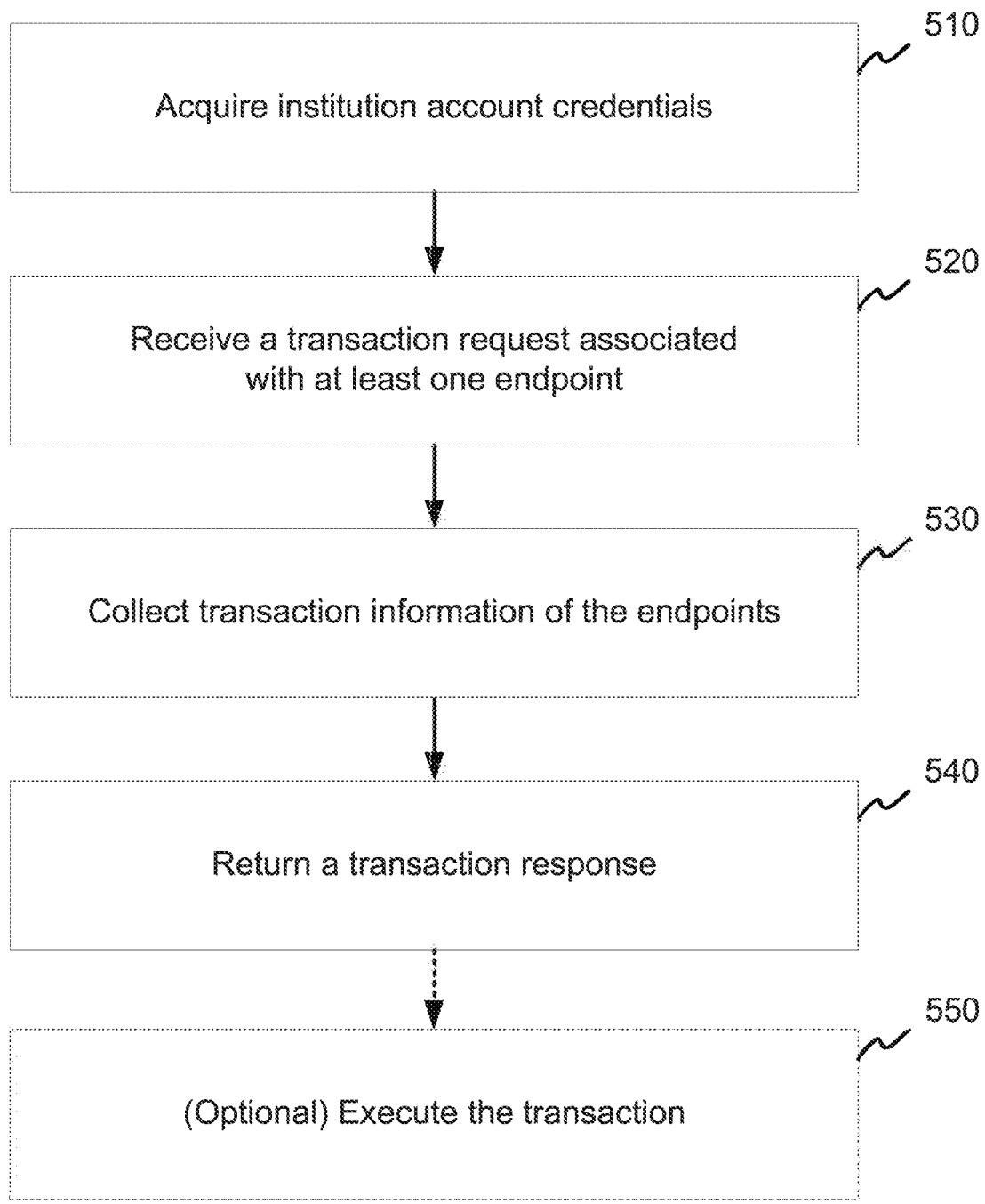
FIG. 5 is a flowchart illustrating an example method of processing transactions, according to an embodiment.

FIG. 5 is a flowchart illustrating an example method of processing transactions, according to an embodiment. As shown in FIG. 5, the method can include acquiring user account (also referred to herein as "institution account") credentials (block 510), receiving a transaction request associated with at least one endpoint (block 520), collecting transaction information of the endpoint (block 530), and returning a transaction response (block 540). In some embodiments, the method can optionally include executing the transaction (block 550), which functions to process the transaction between two endpoints. In some embodiments, the method does not perform execution of the transaction, receiving the transaction request functions to initiate the retrieval of transaction addressing information of the at least one endpoint, collecting transaction information of the endpoint includes collecting transaction addressing information of the endpoint, and returning a transaction response functions to transmit the collected transaction addressing information of the endpoint. The method functions to leverage account access during the transaction process. Variations of the method can be used to add functionality such as verifying account information used in financial transfers, programmatically transferring funds, setting programmatic events, catching errors and fraud, performing conditional processing of a transaction, and/or other suitable operations. The method may be performed by the system 100. In some implementations, the transactions are automated clearing house (ACH) transactions, but any suitable type of transaction may be used. In a first implementation, the method enables a customer/developer, via the API 110, to obtain verified ACH endpoint information. For example, an account number and a routing number may be obtained, as well as verification of ownership of the account. In this variation, the system 100 provides the information to execute the transaction. In another embodiment, the method additionally executes the transaction having obtaining the required information and verification. The method of FIG. 5 may be implemented by the system 100, but the method may alternatively be implemented by any suitable system.

Figure 6:
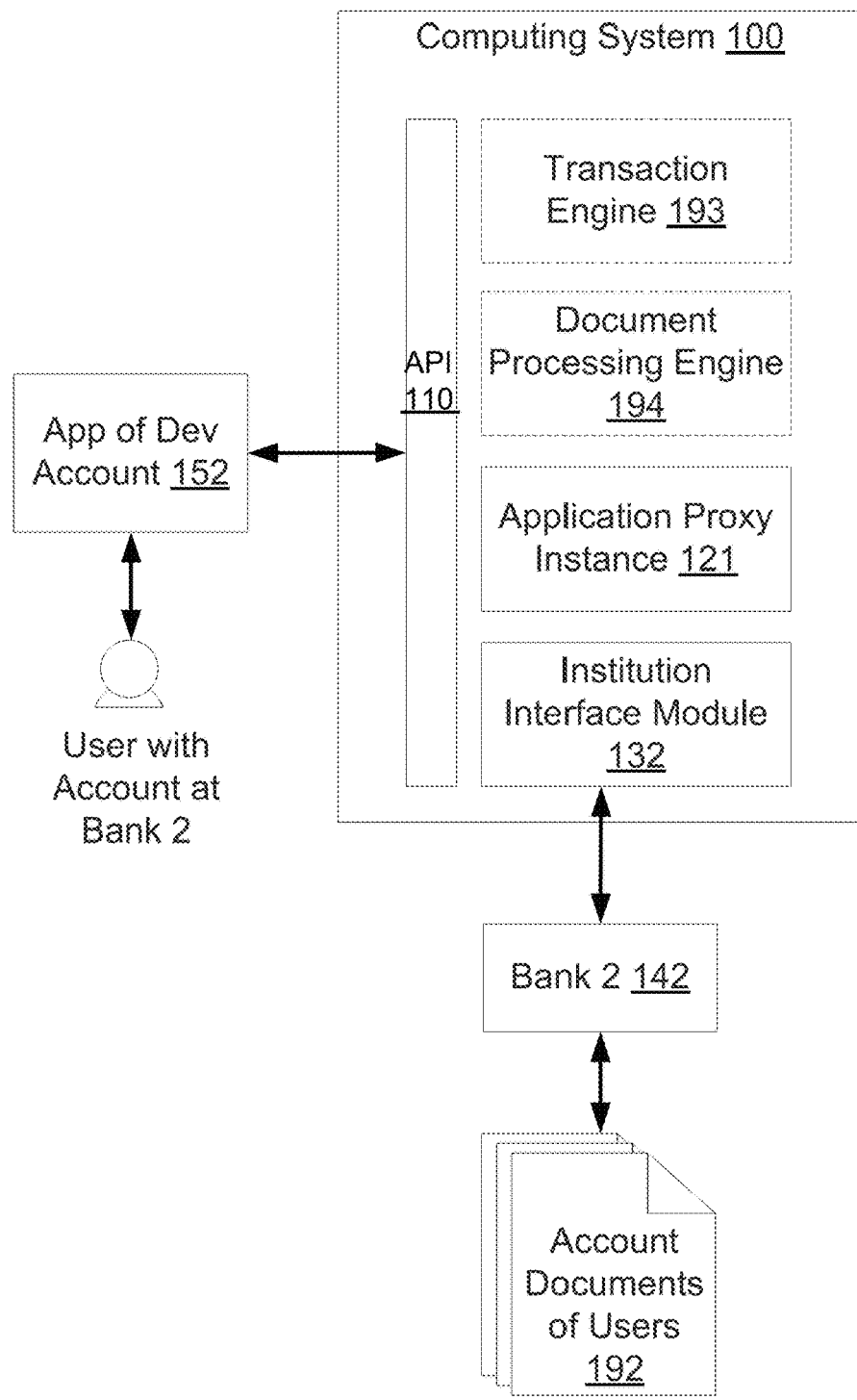
FIG. 6 is a simplified block diagram of the computing system and network environment of FIG. 1, according to an embodiment.

FIG. 6 is a simplified block diagram of the computing system and network environment of FIG. 1, according to an embodiment. The method of FIG. 5 is described below in reference to certain aspects of FIG. 6 (or, alternatively, FIG. 1)

At block 510, which includes acquiring institution account credentials, the system 100 functions to obtain login information for an institution (e.g., the institution 142). The institution account credentials may include a username and password. The account may be an account of an external institution. Additionally, an institution may include additionally authentication challenges such as a pin code, security questions, single-use passwords, secondary device code verification, biometric identification, and/or any suitable form of multi-factor authentication (MFA), as described above. Such additional authentication challenges may be collected at the same time of the account credentials, but the MFA authentication process may alternatively be defined in the API protocol. For example, if the primary account credentials are not sufficient, the MFA challenge may returned in a response, this additional credential request can be repeated as required before access to the account is obtained. The institution account credentials can additionally be stored, and automatically used to complete subsequent access or login attempts.

The account credentials may be provided through an API request of a customer/developer or application of the customer/developer to the API 110. The API 110 may be used in establishing, setting up, or enrolling a new user account. One user may have at least one associated user account at an external institution, but may be linked or associated with multiple user accounts at multiple external institutions. Account credentials may be obtained for each user account.

At block 520, which includes receiving a transaction request associated with at least one endpoint, the system 100 functions to initiate the retrieval of transaction addressing information of an endpoint. The endpoint may be a transaction endpoint, which may be any suitable endpoint from which funds may be withdrawn or deposited. In a common transaction, there is a single withdrawal account and a single deposit account. The method can be used in obtaining information for one or more endpoints. In some variations, there may be a plurality of withdrawal and/or deposit accounts. In one variation, the transaction request is identical to an enroll user request used to obtain the user credentials of block 510. The account credentials may alternatively be previously obtained or obtained in response to the transaction request.

In one variation, in which the transaction request is for information about an account, the API request may specify an institution and account credentials. Additional credentials may additionally be required such as a pin code, state in which an account was created, or MFA challenge answers. A second request with similar parameters may be submitted to obtain the account credentials for other involved transaction endpoints.

In another variation, the transaction request may explicitly define the transaction details. The transaction request may include at least one withdrawal account endpoint and deposit account endpoint. Account credentials may be specified for each endpoint. In one variation, a single API request may include account credentials for both endpoints. In another variation, a transaction resource is used, such that withdrawal endpoint information, deposit account information, and transaction details can be specified asynchronously. For example, a transaction resource is created through an API request via API 110. Later, an API request hits the new transaction resource (by specifying a transaction identifier) to specify withdrawal information, then deposit information, and then the amount to be transferred. Once all the information is populated, the transaction may be executed either automatically, in response to an executed command, or scheduled for a later time. Bulk, aggregate, or group transactions may additionally be specified in a request. If multiple entities are withdrawal endpoints, then the division of funds may be specified (e.g., a percentage breakdown or amount break down). Similarly, funds for multiple deposit endpoints may be specified.

At block 520, which includes collecting transaction information of the endpoint, the system 100 functions to access and determine properties of a transaction endpoint. Collecting transaction information of the endpoint may involve using the account credentials to gain account access in an institution. The account access may be facilitated by using a proxy application, as described above. The account access can be used to request and obtain account documents that include endpoint information. The account documents may include bank statements or other suitable documents. If the documents are in pdf or other alternative formats, the content may be scraped to identify transaction information.

At block 530, the system 100 collects transaction information and/or transaction addressing information of the endpoint. The account addressing information may be the account number and the routing number of an account. Billing address, wire routing number, and/or other account information can additionally be pulled. In one variation, the account number and routing number are available in banking statements. An extraction script may be used to pull the document and then isolate the information from the document. Accessing the account number and the routing number in an automated fashion may avoid chances of error. As a first benefit, access to the account provides evidence of that the owner of the account participated in providing the transaction endpoint information. As another benefit, the information is automatically pulled, which avoids human error.

Collecting transaction information of the endpoint, at block 530, may additionally include collecting transaction status information of the endpoint, which can include indication of fund requirements, account fraud checks, and other status information. Various stages can be built into providing the transaction information, which provide different safeguards and/or features into financial transactions.

In a first optional stage, the transaction status information can determine a sufficient funds status. The sufficient funds status may be applied to a withdrawal account to ensure that the account has funds to complete the transaction. Transaction history and/or current fund value may be accessed through the account access. In one variation, the fund amount is returned in the response such that the customer/developer/application can respond appropriately. In another variation, the transaction amount is compared to available funds. If sufficient funds are not found, then an error or warning may be raised.

In another optional stage, the account may be processed for fraud patterns. For example, the age of the account may be accessed. Newly created accounts may be less trustworthy than established accounts with significant history. Similarly transaction history may be assessed for fraudulent behavior. If the account is used for a diverse range of transactions indicative of normal behavior then the account may be identified as normal. If the account only participates in repeated high value transactions or other fraud patterns, then the account may be flagged as fraudulent. Additionally, the entities involved in the transaction may be indicative of fraud.

The method may additionally include verifying transaction conditions during one or more stages. Transaction conditions may be used to take any suitable action. The available actions can include permitting a transaction or preventing a transaction. Additionally, the action can include sending a notification. The notification can include an email, text message, a platform message, a phone call, or any suitable notification. The action may additionally include triggering a programmatic event. In one variation the programmatic event is a callback event, wherein and HTTP message is sent to a destination. Conditions may be customized or selected from a set of provided conditions. Example conditions can include a condition that triggers a notification for transactions over a particular amount; a condition based on available funds after the transaction to alert a user to funds below a threshold; and a condition based on the frequency of transactions or the entities involved in the transaction account. Conditions can be scoped for a developer account, a particular institution account, or for any suitable scope of entities.

At block 540, the system 100 returns a transaction response so as to transmit the results of the transaction request. The transaction response is may be made in a synchronous API message from the API 110 that is sent in response to an initial request. Alternatively, a status API resource may be used such that an application/service can periodically check the status API resource to determine the processing status and/or the results. Alternatively, any suitable approach may be used to provide the results to the initial request.

In an implementation, the response provides the addressing information used for an endpoint. If there are no errors or warnings with respect to the account, then account information may be NACHA compliant as the endpoint information was accessed and obtained in a manner that validates the ownership of the account (e.g., by providing credentials and optionally multi-factor authentication responses). The transaction response can include the account number, the routing number, and/or any additional information for the endpoint that is used in executing the transaction. The transaction response may additionally include the available funds, such that the requesting entity can check for sufficient funds. The response may additionally indicate if sufficient funds are available if the transaction amount was provided, which functions to hide the available funds from the requesting entity while preventing overdraft transaction. The transaction response can additionally include other fields such as a status field, where the account may be labeled according to any categorization of the account. For example, the status may indicate that the account is normal or fraudulent.

Additionally or alternatively, the method can include optional block 550. At block 550 the system 100 executes the transaction, which functions to process the transaction between two endpoints. In this variation a request to execute a transaction between at least two endpoints is received. Additionally, returning a transaction response may include returning results of the transaction in the response. In another implementation, the method includes executing the transaction. The transaction response can include information about the status of the transaction when the transaction is submitted, being processed, and/or completed. Transactions may not be instantaneous, and as such the initial transaction response may indicate if the transaction was successfully initiated. Successfully initiated means that the transaction endpoint information was successfully retrieved, that any conditional stages (such as a sufficient funds stage, a fraud-check stage, and custom conditions) are satisfied. A subsequent response or status resource may be updated that reflects the status of the transaction. A transaction resource may be updated with a pending process, when the transaction is initiated and proceeding normally. The transaction resource can be updated with a completed status possibly indicating the time of completion. If an error or issue is encountered, the status of the transaction resource may be updated to reflect the error or issue. The method may additionally include monitoring status of transaction and triggering programmatic event according to the status.

In one variation, executing the transaction can include establishing proxy accounts in at least two institutions, and expediting transactions between the two institutions through a an internal deposit to a first proxy account in a first institution and a second internal deposit from a second proxy account in the second institution. In some cases, transactions between institutions are slower than transactions made within an institution. By establishing cross institution account network, transactions can be facilitated between two accounts in different institutions with similar speeds of internal transactions. The proxy accounts may include a funds reserve, which may be periodically balanced between proxy accounts to maintain an operational reserve of funds.

Additionally, the method may be applied to create an abstraction between a user and the underlying account. A transaction endpoint can be abstracted to a user entity, which may be associated with multiple optional transactional endpoints (e.g., different bank accounts). Accordingly, the method may include selecting an institution, which functions to dynamically select a connected account to participate in a transaction. Various conditions may be set to respond to events when receiving a transaction request, collecting information for the transaction, and/or executing a transaction. In one variation, one institution is set as a primary account and another account managed by the same entity is set as a secondary account. If the primary account is not able to complete a transaction, the method may detect an error condition and automatically fails over to the secondary account. In another variation, a set of accounts may be preconfigured to be used depending on properties of the request. In combination with the proxy transfer endpoint, the identifying information for the proxy endpoint can be used, but the underlying service automatically will use an automatically selected account to use for the funds. For example, a set of entities and/or category of entities/transactions may be set to use particular accounts. Similarly, transactions to one proxy account may be automatically split into transactions with multiple associated accounts. For example, an account holder may set a proxy account to automatically split deposits between two accounts in a 30/70 balance.

Referring now to FIG. 6, the system 100 functions to provide an interface (e.g., via the API 110) for applications and services that can facilitate the process of transferring funds. The system 100 can function to provide verified account information used in ACH transfers, to execute transfer of funds, to enable programmatic events during transfer process, to mitigate risk and errors, and/or provide alternative transaction functionality. As described above in reference to FIG. 1, the system 100 is part of a larger API platform, which provides and API to access account data and execute transactions, among other items. In some variations, the system 100 is part of a multi-tenant API platform that enables a plurality of developers to create accounts and build applications and/or services that leverage the API of the API platform. In alternative variations, the system 100 is part of a single-tenant API platform and may provide an internal API for a dedicated set of products or services. For example, a product may be built on top of the API platform that enables end users to create accounts to manage accounts with one or more institutions (e.g., banks, credit card companies, investment managers, etc.).

The API 110 functions to provide an interface for accessing institution transaction endpoint information. The API 110 can additionally provide a normalized customer facing interface. In one implementation, the API 110 leverages an application proxy instance 121, which simulates a proprietary first-party application accessing a closed API of as institution (e.g., the institution 142). The system 100 can include additional components or services that particularly facilitate the access of information relating to a transaction endpoint. For example, a service, script, or module can be configured to access statements or other suitable documents that can contain endpoint information such as account number and routing number information. The statements or information may be contained in pdf or other suitable document formats. The system 100 can include document readers that can access and extract the requested information from the statements.

In one variation, the API 110 allows an API request to specify an account, and a response output provides the information related to executing a transaction with the endpoint. In one implementation, the API 110 can include at least one API resource for interacting with transaction endpoint. As shown in FIG. 7, an endpoint information request can include institution credentials of an account. The credentials can include username and password. The API protocol can additionally provide a mechanism for completing multi-factor authentication challenges such as security questions, or code-based multi-factor authentication. The API request may additionally include other properties such as developer account identifiers, API authentication tokens, institution type identifiers, and other suitable parameters. The response is a data object that includes at least automatically obtained information such as tracking number, routing number, and/or wire routing number. Additional response information can include funds amount (or alternatively a Boolean indicator of if the funds are sufficient), an account status (e.g., is the account fraudulent, trusted, etc.), billing address of the account, name of the institution, type of account (e.g., saving, depository, etc.), and other suitable properties. Other API properties or features can include a mechanism to specify if endpoint information is requested or if the transaction should be executed.

The institution interface module 132 functions to model the internal interface of at least one first-party application with an external institution (e.g., institution 142). The account credentials of a user account (and optionally multifactor authentication credentials) can be used for an application proxy to gain access to an institution through the institution interface module. The system 100 may additionally include a transaction engine 193, which can facilitate the transfer of funds between two accounts. The transaction engine 193 can be integrated with the API 110, such that an API request can direct the execution of a transaction. The transaction engine 193 can execute ACH transactions, but may alternatively or additionally use other financial tools to withdrawal funds and/or deposit funds. With a transaction engine, transactions can be executed between two accounts that have been configured with account credentials, the API response may include the status of the transaction, transaction errors, a status URI or any suitable response to facilitate executing a transaction as shown in FIG. 8. In one variation, proxy accounts can be used in different institutions. With sufficient reserves, transfers between institutions can be expedited by transferring funds to and from the proxy accounts, and then asynchronously updating the proxy accounts.

The system 100 can additionally include other components such as a messaging/notification system, which can manage alerts and/or triggering programmatic events (e.g., callbacks). The system 100 may additionally or alternatively include any suitable components In some implementations, the system 100 includes a document processing engine 194. In some implementations, the document processing engine 194 is constructed to process account documents (e.g., account documents 192) of an external user account system (e.g., bank system 142) of an external institution. The account documents may be processed to identify and/or obtain transaction information. In some implementations, in a case where the documents are in a PDF format, the document processing engine 194 is constructed to scrape content of the PDF documents to identify the transaction information. In some implementations, the document processing engine 194 is an extraction script that is constructed to pull the document and then isolate the transaction information from the document (e.g., as described above in reference to FIG. 5). In some implementations, the system 100 accesses the document, stores the accessed document (e.g., in a memory or other storage medium of the system 100), and then controls the document processing engine to process the stored document to identify the transaction information.

Figure 9:
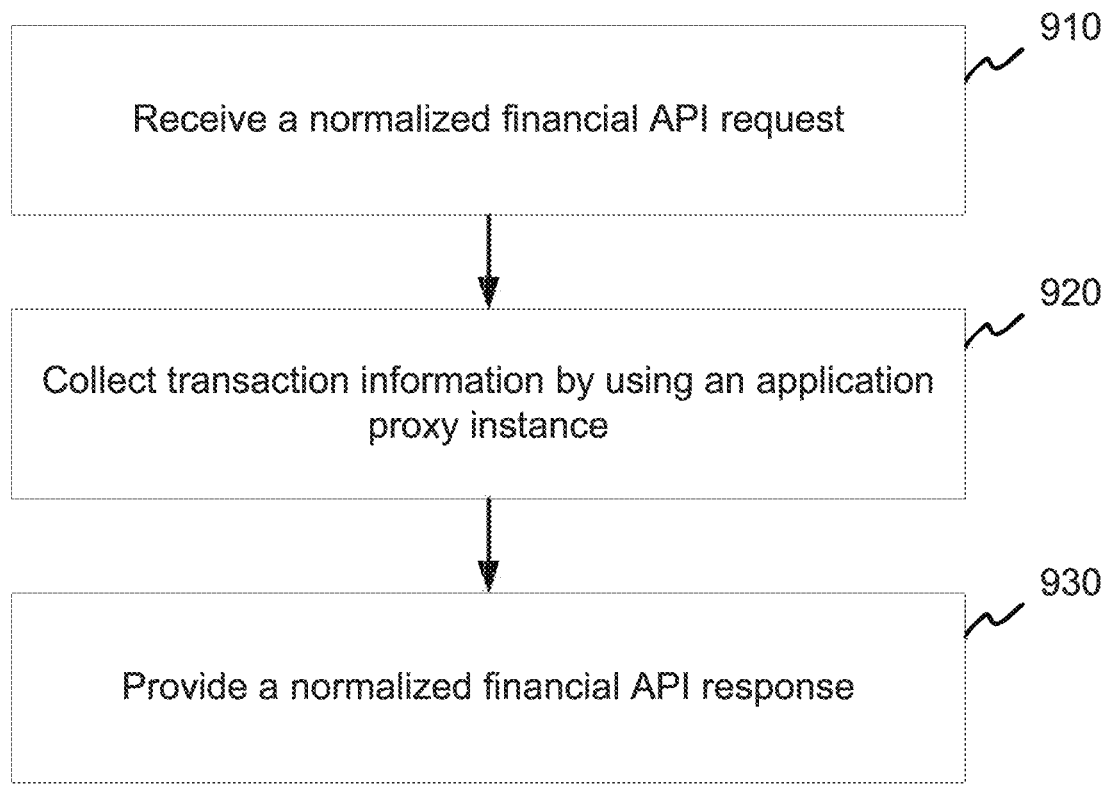
FIGS. 9-10 are flowcharts illustrating example methods of processing transactions, according to various embodiments.
Figure 10:
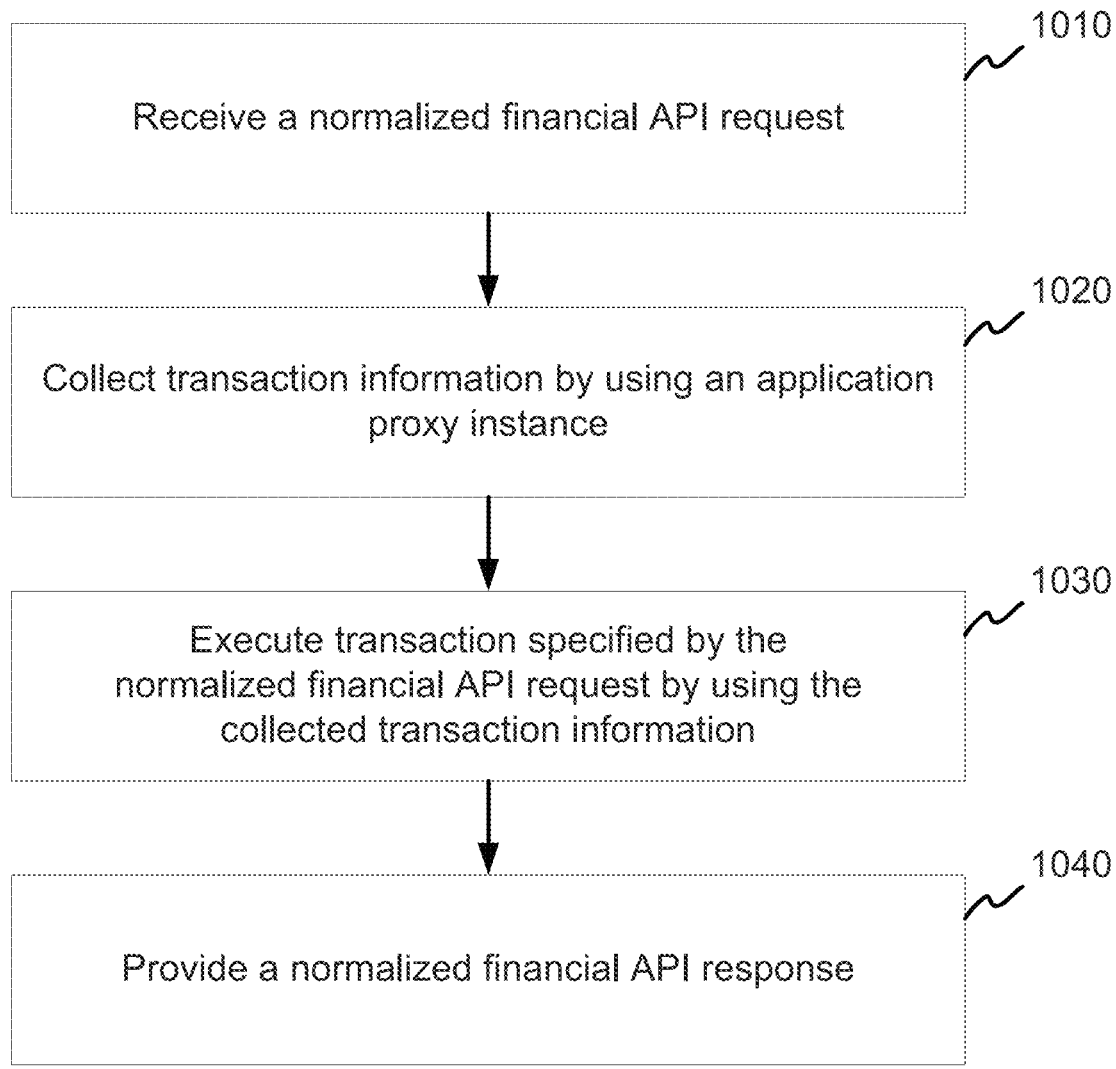

FIGS. 9-10 are flowcharts illustrating example methods of processing transactions, according to various embodiments. The methods of FIGS. 9-10 are described below in reference to certain aspects of FIG. 1 (or, alternatively, FIG. 6).

Referring to FIG. 9, a method for processing a normalized API request at the system 100 includes: receiving a normalized API request associated with at least one account endpoint, the normalized API request being provided by an external user-facing system/application (e.g., system/application 152 of FIG. 1) by using API 110 of the system 100, the normalized API request specifying account credentials of each account endpoint of the normalized API request (block 910).

Responsive to the normalized API request: transaction information of each account endpoint of the normalized API request is collected by using an application proxy instance (e.g., one of proxy instances 121, 122, and/or 123 of FIG. 1) associated with the account endpoint to collect the transaction information from a corresponding institution system (e.g., an external user account system 141, 142, and/or 143 of FIG. 1) by using the associated account credentials specified by the normalized API request and a proprietary AP) (e.g., one of APIs 161, 162, and/or 163 of FIG. 1) of the system 100 (block 920).

Further, a normalized API response is provided to the external user-facing system/application (block 930). The normalized API response provides the transaction information of each account endpoint of the normalized API request. Each application proxy instance is constructed to simulate an application of the corresponding external institution system.

In some implementations, the collected transaction information for each account endpoint includes at least an account number and a corresponding routing number for use in automated clearing house (ACH) transactions. In some implementations, the transaction information is collected by processing at least one statement accessed from the corresponding external institution system.

Additional examples and details of obtaining transaction and account information via proxy instances of the system may be found in U.S. patent application Ser. No. 14/790,897, filed Jul. 2, 2015, and titled "SYSTEM AND METHOD FOR FACILITATING PROGRAMMATIC VERIFICATION OF TRANSACTIONS" (referred to herein as "the '897 application"). The entire disclosure of this application is hereby made part of this specification as if set forth fully herein and incorporated by reference for all purposes, for all that it contains.

Referring to FIG. 10, a method for processing a normalized API request at the system 100 includes: receiving a normalized API request associated with at least one account endpoint (block 1010). The normalized API request is provided by an external application system by using a platform API of the platform system. The normalized API request specifies a transaction and at least one of an account token and account credentials of each account endpoint of the normalized API request.

Responsive to the normalized API request, transaction information of each account endpoint of the normalized API request is collected (block 1020). The transaction information is collected by using an application proxy instance associated with the account endpoint to collect the transaction information from a corresponding institution system by using at least one of an associated account token and associated account credentials specified by the normalized API request and by using a proprietary API of the institution system.

The transaction specified by the normalized API request is executed by using the collected transaction information (block 1030). A normalized API response is provided to the external system (block 1040). The normalized API response provides results of the transaction. Each application proxy instance is constructed to simulate an application of the corresponding external institution system.

In some implementations, the collected transaction information for each account endpoint includes at least an account number and a corresponding routing number for use in automated clearing house (ACH) transactions.

In some implementations, the transaction information is collected by processing at least one statement accessed from the corresponding external institution system.

Additional examples and details of such functionality of the system may be found in the '897 application.

In some implementations, the user information of the normalized API request includes a user account identifier for each user account of the external user-facing system/application (e.g., the external user-facing system/application 152) corresponding to the normalized API request.

In some implementations, the normalized API request includes parameters as shown in Table 1.

TABLE 1

| NORMALIZED API REQUEST PARAMETER | DESCRIPTION |
| --- | --- |
| <Platform Account ID> | An account of an external user-facing system/application (e.g., "Dev Account A", "Dev Account B" of FIGS. 1 and 4A-4B). |
| <User Account Identifier> | An identifier that identifies a user account of the application system identified by the <Platform Account ID> parameter. |
| <Institution ID> | An identifier that identifies an external institution system (e.g., institutions 141, 142, and/or 143). |

In some implementations, the <User Account Identifier> is used to select at least one corresponding application proxy instance, and each selected application proxy instance includes user credentials (e.g., as depicted in FIG. 4B) to access the associated institution system.

In some implementations, the system 100 determines an application proxy instance associated with the normalized API request based on the <Platform Account ID> parameter, the <User Account Identifier> parameter, and the <Institution ID> parameter. In some implementations, the system 100 identifies an application proxy instance of the application proxy system 120 that is managed in association with the <Platform Account ID> parameter, the <User Account Identifier> parameter, and the <Institution ID> parameter, and uses the identified application proxy instance to collect the transaction information.

In some implementations, each proprietary API request includes parameters as shown in Table 2.

TABLE 2

| PROPRIETARY API REQUEST PARAMETER | DESCRIPTION |
| --- | --- |
| <User Credentials> | The user credentials of the corresponding normalized API request. The user credentials are specified by the application proxy instance, e.g., 421-425, (e.g., as shown in FIG. 4B) used to provide the proprietary API request. |

In various other implementations, the normalized API requests and/or the proprietary API requests may include other sets of parameters, depending on the specifics of the APIs and the types of requests involved. For example, other requests may include identifier tokens, multiple account identifiers (e.g., when requesting transfer of funds), etc.

Additional examples and details of such other types of requests and functionality of the system may be found in the '897 application.

System Architecture

Figure 11:
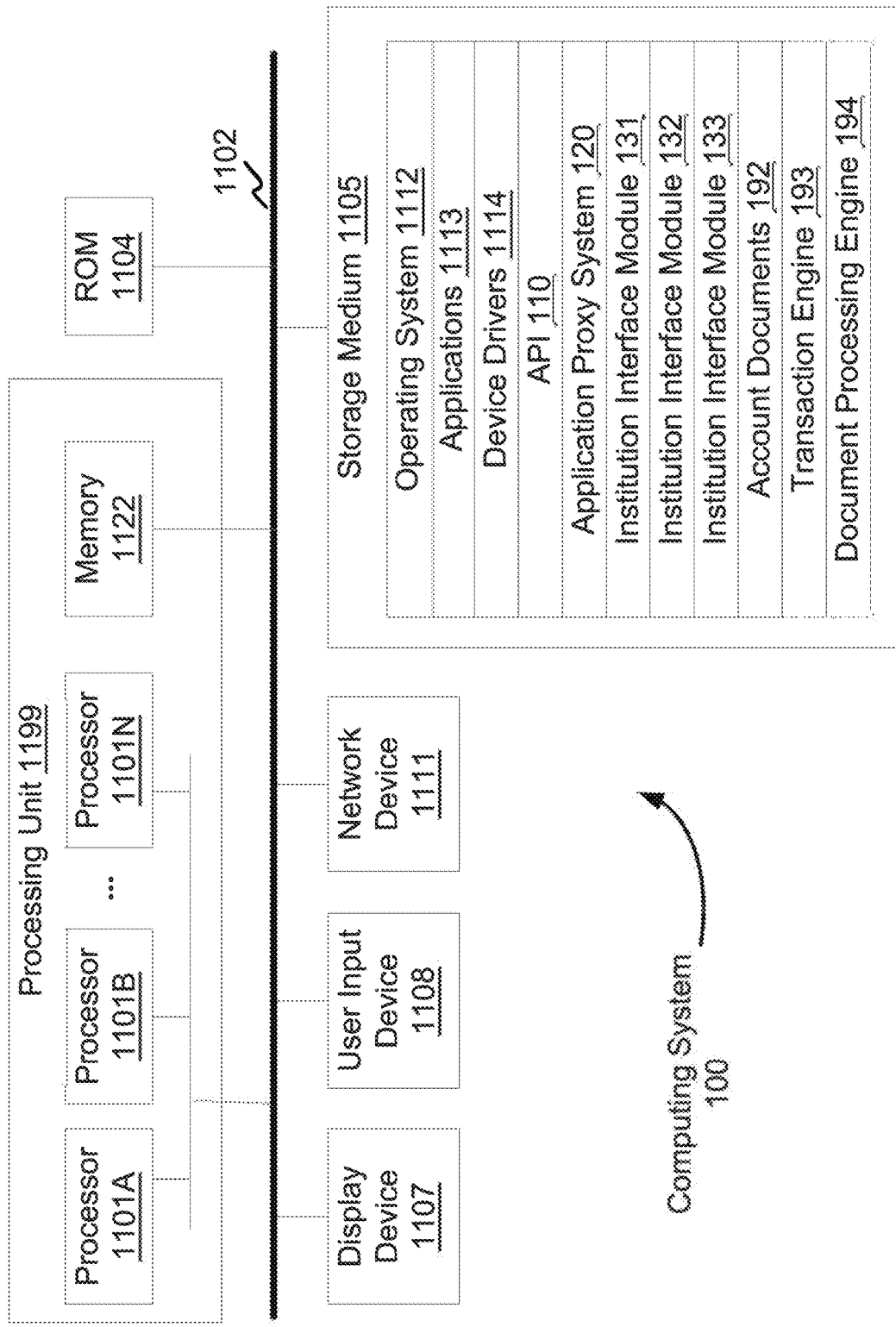
FIG. 11 is a block diagram of an example architecture of the system, according to an embodiment.

FIG. 11 is an architecture diagram of the system 100 according to an implementation in which the system is implemented by a server device. Alternatively, the system may be implemented by a plurality of devices, in a hosted computing environment (e.g., in a cloud server), and/or in any other suitable environment.

The bus 1102 interfaces with the processors 1101A-1101N, the main memory (e.g., a random access memory (RAM)) 1122, a read only memory (ROM) 1104, a computer-readable storage medium 1105 (e.g., a non-transitory computer-readable storage medium), a display device 1107, a user input device 1108, and a network device 1111.

The processors 1101A-1101N may take many forms, such as ARM processors, X86 processors, and/or the like.

In some implementations, the system includes at least one of a central processing unit (processor) and a multi-processor unit (MPU).

The processors 1101A-1101N and the main memory 1122 form a processing unit 1199. In some embodiments, the processing unit includes one or more processors communicatively coupled to one or more of a RAM, ROM, and computer-readable storage medium; the one or more processors of the processing unit receive instructions stored by the one or more of a RAM, ROM, and computer-readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes one or more of an API, an application proxy system, one or more instance interface modules, account documents, a transaction engine, a document processing engine, and/or any other functionality or aspects of the system as described herein.

The network adapter device 1111 provides one or more wired or wireless interfaces for exchanging data and commands between the system and other devices, such as external user account systems (e.g., institutions 141, 142, and/or 143), external user-facing systems/applications (e.g., applications 151 and/or 152), user devices (e.g., user devices 171 and/or 172), and/or the like. Such wired and wireless interfaces include, for example, a universal serial bus (USB) interface, Bluetooth interface, Wi-Fi interface, Ethernet interface, near field communication (NFC) interface, and/or the like. In some embodiments, the system communicates with other devices via the Internet.

Machine-executable instructions in software programs (such as an operating system, application programs, and device drivers) are loaded into the memory 1122 (of the processing unit 1199) from the processor-readable storage medium 1105, the ROM 1104 or any other storage location. During execution of these software programs, the respective machine-executable instructions are accessed by at least one of processors 1101A-1101N (of the processing unit 1199) via the bus 1102, and then executed by at least one of processors 1101A-1101N. Data used by the software programs are also stored in the memory 1122, and such data is accessed by at least one of processors 1101A-1101N during execution of the machine-executable instructions of the software programs. The processor-readable storage medium 1105 includes an operating system 1112, software programs/applications 1113, device drivers 1114, the API 110, the application proxy system 120, the institution Interface modules 131, 132, and 133, and account documents 194. In some implementations, the processor-readable storage medium 1105 includes the transaction engine 193 and the document processing engine 194.

Further details regarding the system architecture are described below.

User Attribute Estimation

Processed transactions from one or more account endpoints (e.g., obtained using the processes illustrated in FIGS. 9-10) can be used for a variety of useful applications. For example, obtained transaction information associated with the account endpoints can be used to automatically estimate one or more attribute values associated with the user, without requiring any action on the part of the user. In some implementations, the estimated attribute values may be used to predict projected future values of the attribute associated with the user for one or more future time periods.

For example, in some embodiments, the attribute values may correspond with income streams of the user, wherein the obtained transaction information is used to perform income estimation for an owner of the account, such as by determining and combining income stream attribute values associated with multiple income streams. Income estimation can be useful to quickly and automatically assess the past income of an owner associated with an account endpoint, and/or to predict a future income of the owner, without requiring affirmative action by the owner, e.g., providing documentation such as pay stubs, account statements, etc. In addition, income estimation can be used to account for different types of income, including both employer income and non-employer income. In some embodiments, income estimation may be used to assess the suitability of the owner for certain types of marketing or financial services, such as loans, investment opportunities, and/or the like.

Each account owned by an owner may be associated with one or more streams of income. For example, the account may receive a first stream of income corresponding to a salary from a job, a second stream of income corresponding to interest or dividends from an investment, and/or the like. In some embodiments, an income stream may correspond to any type of regularly occurring payment to the owner. By analyzing the transactions associated with an account, income streams from different sources can be identified.

Processed transactions retrieved from an account endpoint (e.g., using the processes illustrated in FIGS. 9-10) may be received as raw data. FIG. 12 illustrates example raw transaction data that may be received from an account endpoint, in accordance with some embodiments. The raw data may comprise data for a plurality of transactions (e.g., first transaction 1202 and second transaction 1204), each associated with a plurality of attributes, such as a transaction ID 1206, a transaction date 1208, a transaction amount 1210, a transaction pending flag 1212, and a transaction description 1214. In some embodiments, transactions may be associated with different attributes, based at least in part upon the external financial institution associated with the account endpoint.

In some embodiments, the transaction description for a transaction may be used to identify a source of the transaction. For example, the transaction description 1214 of the first transaction 1202, "Electronic Deposit Pub Emp Ret Sys", indicates that the transaction is an electronic deposit from "Pub Emp Ret Sys." The transaction description may also be used to determine a type (or category) of transactions (e.g., an "electronic deposit", an "interest payment", and/or the like). In some embodiments, the transaction may be associated with a separate transaction source attribute. Multiple transactions from the same source may be grouped into a "transaction group."

In some embodiments, transaction descriptions may be "cleaned" in order to better identify a source of the transactions and determine which transaction group the transactions belong in. Cleaning a transaction description may comprise removing portions of the transaction description, such as certain recognized keywords, dates, and/or the like. For example, a transaction description of "Electronic Deposit from Acme Corp. on Jun. 15, 2015" may be cleaned to read "Acme Corp." or "Deposit from Acme Corp." This allows for multiple transactions having different transaction descriptions (for example, "Electronic Deposit from Acme Corp. on May 15, 2015", "Electronic Deposit from Acme Corp. on Jun. 15, 2015", and "Electronic Deposit from Acme Corp. on Jul. 15, 2015") to be recognized as originating from the same source and thus part of the same transaction group. In some embodiments, cleaning the transaction descriptions may comprise removing any non-ascii characters in the description, replacing uppercase characters with lowercase, dropping any characters appearing after one or more recognized characters or strings (e.g., a backslash "/", certain recognized strings such as "PPD" indicating "Prearranged Payment and Deposit Entry", and/or the like), etc. In some embodiments, words meeting certain criteria may be stripped from the transaction description (e.g., words having more than a certain number of digits). In some embodiments, a list of "strip words" containing words to be removed from a transaction description may be maintained and used to identify and "clean" transaction descriptions (e.g., by removing strip words from the transaction descriptions).

In some embodiments, transaction descriptions of transactions from different accounts may be cleaned differently. For example, different accounts associated with different sources (e.g., different external financial institutions) may be known to format transaction names in different ways. As such, different rules for cleaning transaction descriptions may be implemented for transactions associated with accounts from different sources.

In some embodiments, transaction groups may also be identified based at least in part upon the dates of the transactions. A plurality of transactions associated with a particular source may be divided into two or more different transaction groups associated with different time periods, if a time period between consecutive transactions exceeds a threshold value. In some embodiments, if the time period between sets of transactions is large compared to a time period between a first and last transaction of the sets, the sets may be identified as different transaction groups. For example, a first and a second transaction group associated with a source may each comprise transactions spanning over periods of two months. If the period between the first and second groups (e.g., a year) is significantly longer than the period spanned by each group, the transactions may be split into separate transaction groups instead of being identified as part of the same transaction group.

In some embodiments, only transactions having a transaction amount exceeding a threshold level (e.g., $100) are considered when identifying transaction groups. In some embodiments, at least a threshold number of transactions must be present in order to be identified as a transaction group (e.g., 4 transactions). In some embodiments, where transaction data from multiple accounts is retrieved, each transaction group may only comprise transactions associated with a single account.

Each of the identified transaction groups can be analyzed to determine whether or not it corresponds to an income stream. When analyzing a transaction group, a probability or confidence value may be determined, indicating a likelihood that the transaction group corresponds to an income stream. The probability value may be based upon a plurality of different factors, including but not limited to: the dates of the transactions in the transaction group, the amounts of the transactions, the transaction descriptions of the transactions, and/or the like.

The dates of the transactions may be analyzed to determine how regularly the transactions of the transaction group occur. If transactions from a particular transaction group occur at regular intervals (for example, during the second week of every month), the transaction group may be more likely to correspond to an income stream. In some embodiments, a score may be calculated indicating a regularity of transaction occurrences in the transaction group. The score may be determined based upon a plurality of different factors, such as mean time between transactions, mode time between transactions, fraction of times between transactions equaling the mode time, standard deviation of times between transactions, mean time or standard deviation of times between transactions after removing transactions having values outsides of certain bounds (e.g., 2 standard deviations from the mean transaction amount of the group), and/or the like.

In some embodiments, the transaction amounts of the transactions in the transaction group may be analyzed to determine a uniformity of the transaction amounts. More uniform transaction amounts may be considered to be indicative of an income stream. For example, income earned from a job (for example, a salary) is often paid in regular amounts over regular intervals from time. Some types of income, such as income received as a result from interest from an investment, may not remain constant, but can still be expected remain within certain bounds. In some embodiments, a score may be calculated indicating a uniformity of transaction amounts of the transactions in the transaction group. In some embodiments, an aggregate score indicating a distribution of transaction amounts over time associated with the transaction group can be calculated. The score may be determined based upon a plurality of factors, such mean, standard deviation, or mode of transaction amounts, fraction of transactions having round amount values, fraction of transactions having the mode transaction amount, and/or the like.

In some embodiments, certain transactions may have descriptions that are more indicative of an income stream. For example, transaction groups having transaction descriptions including the word "payroll" may be considered to be more likely to correspond to an income stream. The system may maintain a list of keywords or phrases indicative of income streams (e.g., "payroll", "salary", "weekly pay", and/or the like, as well as known abbreviations such as "payrl" or "pyrl"), which may be compared against the transaction descriptions. Transactions having descriptions containing any of these keywords may be flagged as income, increasing the confidence that a transaction group that they are a part of corresponds to an income stream.

The number of transactions in the transaction group may also be considered. For example, a transaction group containing a large number of transactions may be considered to be more likely to correspond to an income stream than a transaction group with only a small number of transactions. In some embodiments, the number of transactions may be considered when calculating scores reflecting transaction date regularity and transaction amount uniformity.

In some embodiments, various attributes (e.g., number of transactions in the group, mean transaction amount, standard deviation of transaction amounts in the group, and/or the like) are determined for each transaction group. The determined attributes may be received by a classifier module, which determines a probability score indicating a likelihood that the transaction group corresponds to an income stream, based upon the attributes associated with the group. In some embodiments, the classifier module may determine the probability score using at least one of a support vector machine, an ensemble of decision trees, regularized logic regression, a neural network, or any combination thereof.

In some embodiments, scores for each factor of a plurality of factors may be aggregated as a weighted sum in order to calculate a final probability value that a transaction group includes income transactions of the user. For example, the probability value for a transaction group may be calculated using the following formula:

$$p = \Sigma w_i s_i$$

where p corresponds to the probability value associated with a transaction group, $w_i$ corresponds to a factor weight for a factor $s_i$, wherein the probability value is based on multiple factors, such as those discussed above, e.g., date regularity, amount uniformity, and/or the like.

FIGS. 13A-13C illustrate examples of transaction groups analyzed as potential income streams. FIG. 13A illustrates a transaction group determined to have a low probability of corresponding to an income stream. In the illustrated transaction group, the transactions do not occur regularly (with a large six-month gap between transactions 42 and 40), and the transaction amounts are not consistent (ranging from $110 to $6000). FIG. 13B illustrates a transaction group determined to have a medium probability of corresponding to an income stream, such as based on commonality in names associated with income (which may increase the probability), but more irregular transaction dates and wider variations in amounts (which may decrease probability). FIG. 13C illustrates a transaction group determined to have a high probability of corresponding to an income stream, where the transaction dates are more regular and the transaction amounts more uniform.

Figure 15:
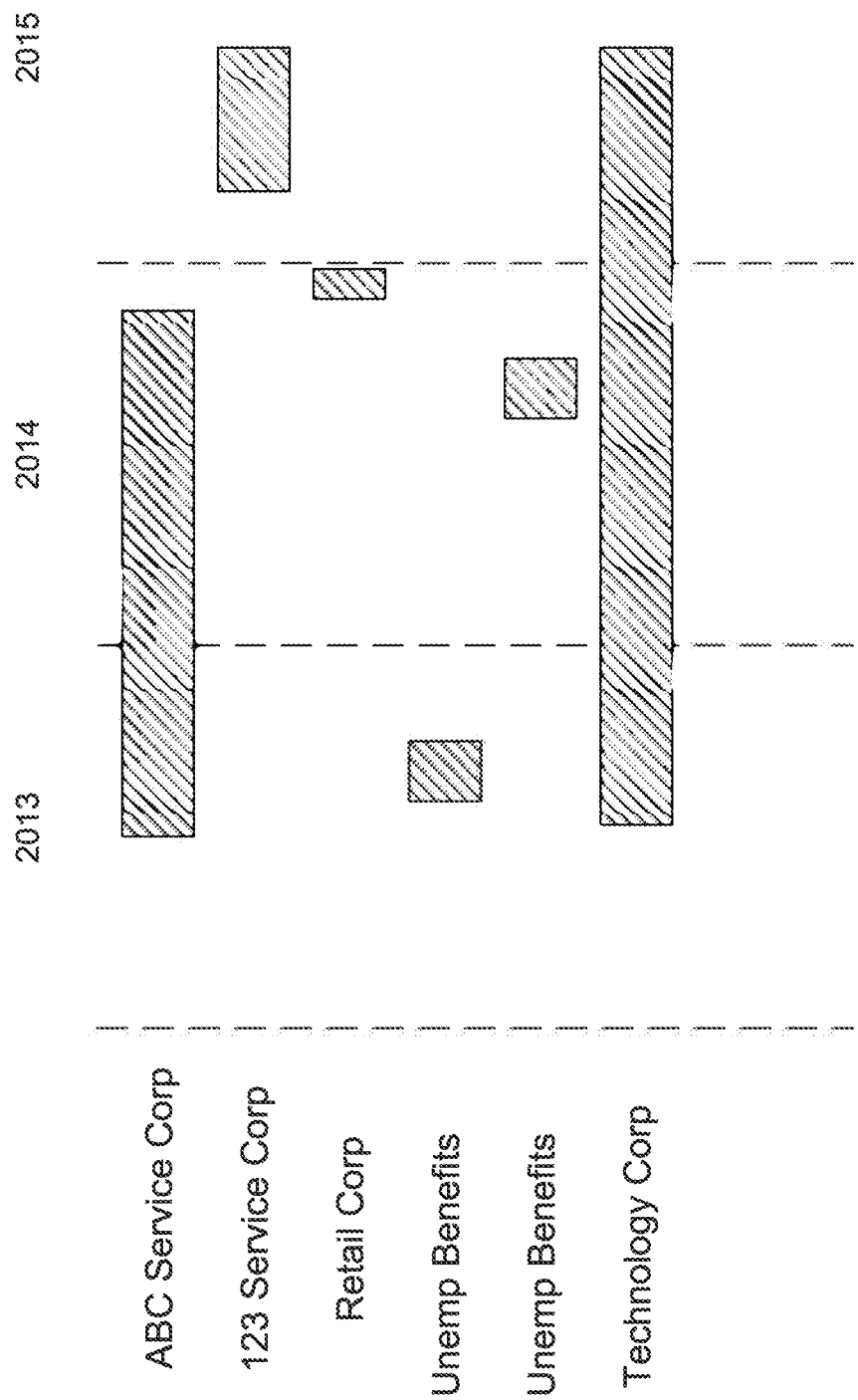
FIG. 15 illustrates a timeline showing the income streams identified in FIG. 14.

Following analysis of the transaction groups for one or more accounts, summary data may be generated indicating the income streams associated with the accounts. FIG. 14 illustrates example summary data that may be generated for one or more accounts in some embodiments. The summary data may comprise data for a plurality of income streams 1402, as well as one or more statistics, which may include a number of income streams (referred to as "jobs") 1404, a calculated income over a previous time period 1406, a project future income 1408, a maximum number of overlapping income streams 1410, a time range associated with the analyzed transactions 1412, and/or the like. Other information, such as the date the income estimation was performed 1414, may also be included. FIG. 15 illustrates a timeline showing the income streams identified in FIG. 14. In some embodiments, the income streams included in the summary data only reflect transaction groups having a confidence value above a certain threshold value (e.g., only transaction groups having a confidence value of 0.7 or above).

As illustrated in FIGS. 14 and 15, six different income streams have been identified. Each income stream may be associated with a plurality of attributes, such as those described in Table 3 below.

TABLE 3

| ATTRIBUTE | DESCRIPTION |
|---|---|
| monthly_income | A monthly income associated with the income stream, calculated based upon a total transaction amount of the income stream and a time period of the income stream |
| confidence | The calculated probability that the transaction group is actually an income stream |
| last_payment_date | A date corresponding to a latest transaction in the income stream |
| name | A description of the income stream, corresponding to a source of the income stream. May correspond to a cleaned transaction description associated with the transactions of the transaction group. |
| days | Corresponds to a length of time between the earliest and latest transactions in the income stream |
| first_payment_date | A date corresponding to an earliest transaction in the income stream |

The statistics associated with the identified income streams can be calculated from the identified income streams. For example, a calculated income over a previous time period (e.g., last year's income 1406) can be calculated by aggregating the transactions associated with the income streams that occurred over the previous time period. The time periods over which each income stream occurs may be used to determine a maximum number of overlapping income streams 1410. For example, as illustrated in FIG. 15, it can be seen the maximum number of overlapping income streams of the income streams included in the summary data illustrated in FIG. 14 at any particular time is 3.

In some embodiments, the statistics may comprise a projected income corresponding to an expected amount of income to be received over a future period of time (e.g., a projected yearly income). The projected income may be calculated based upon one or more currently active income streams. For example, in the illustrated embodiment, the "123 Service Corp" and "Technology Corp" income streams may be considered to be currently active income streams, due to each income stream having a most recent transaction within a designated period of time from the date the income estimation was performed, such as 12 months. When calculating the projected income, the currently active income streams may be assumed to remain active over the future period of time. In some embodiments, the projected income may be calculated based at least in part upon the confidence values associated with the active income streams.

In some embodiments, the projected income may be additionally based upon one or more identified potentially recurring income streams. In some embodiments, transactions originating from the same source (for example, a source corresponding to a seasonal job) may occur for relatively short periods of time over regular intervals (e.g., over a period of 2 months each year). As the account owner may be considered likely to earn income from the source in the future, when projecting a future income, an income stream from the particular source may be considered as a potentially recurring income stream, even though there is no active income stream from the source at the time income estimation is performed (e.g., no transaction associated with the income stream within a specified period of time from when income estimation is performed).

For example, as illustrated in FIG. 14, an income stream associated with "Unemp Benefits" was active between late-June/early-July and mid-August in both 2013 and 2014. As such, even though there may be no active "Unemp Benefits" income stream at the time of income estimation (because there were no income transactions associated with Unemp Benefits within the previous 12 months), a "Unemp Benefits" income stream may be considered as a potentially recurring income stream when estimating a projected income for the account owner (e.g., projected income for 2015).

In some embodiments, whether an income stream can be considered a potentially recurring income stream may be based upon a plurality of factors, such as a regularity of occurrences of the income stream, a level of income amount uniformity between the occurrences of the income stream, a number of occurrences of the income stream, and/or the like.

In some embodiments, a probability value may be calculated indicating how likely an income stream is actually a potentially recurring income stream, which may be used to determine the impact of the recurring income stream on the projected income.

In some embodiments, the projected income may take into account a salary raise associated with at least one currently active income stream. For example, if a large increase in transaction amount occurs in a particular income stream and persists for multiple transactions, a salary raise may be inferred. The income associated with the income stream may be updated to a post-raise amount when calculating the projected income.

In some embodiments, a pre-tax income can be calculated for the owner of the account (e.g., for a previous time period or for a projected future time period). Different income streams may be determined to be pre-tax or post-tax. For example, income streams corresponding to salary received from employers is typically post-tax, while income streams received through investment interest may be pre-tax. In some embodiments, an income stream may be determined to be pre-tax or post-tax based upon the income stream's name/description.

In order to estimate the pre-tax income of a post-tax income stream, a tax rate associated with the owner of the account may be determined. In some embodiments, the tax rate may comprise one or more default values (e.g., tax values corresponding to single status, standard deduction), or based upon one or more collected attributes associated with the owner of the account (e.g., state of residence, marital status, household size, and/or the like). For example, in some embodiments, residency status of the owner may be collect and used to determine a primary state of residence for each calendar year associated with the analyzed transactions, in order to determine a tax rate associated with the transactions.

Some accounts may be joint accounts owned by two or more owners. In some embodiments, income can be estimated for the aggregated owners of the account, or may be split between the owners of the account. In order to estimate separate incomes for each owner of the account, transactions associated with the account may be associated with a particular owner, based upon collected information associated with the owners (e.g., place of employment). For example, a first owner of the account may be known to be associated with a first employer. As such, transactions associated with the first employer can be associated with the first owner for the purpose of income estimation.

Figure 16:
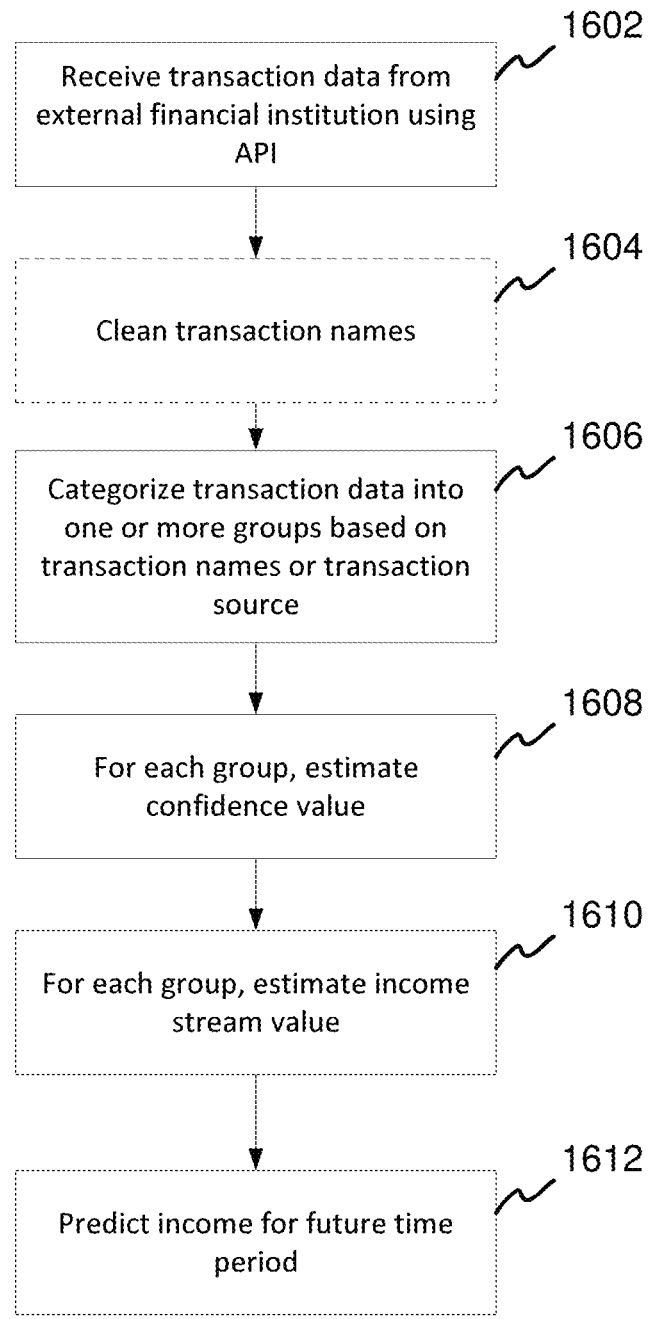
FIG. 16 is a flowchart of a process for performing income estimation, in accordance with some embodiments.

FIG. 16 is a flowchart of a process for performing income estimation, in accordance with some embodiments. Depending on the embodiment, the method of FIG. 16 may include fewer or additional blocks and the blocks may be performed in an order that is different than illustrated. For purposed of illustration, the method of FIG. 16 will be discussed as performed by the computing system 100, such as by the transaction engine 193, but the method may be performed by another suitable computing system.

Beginning at block 1602, transaction data from one or more accounts is received in response for a request for transaction data. The account may be associated with an external financial institution, wherein the transaction data is received through an API (e.g., as illustrated in FIGS. 9 and 10). The transaction data may comprise data within a specified time period, based upon the transaction data request.

In some embodiments, the transaction data may be filtered to remove certain types of transactions. For example, some transactions may be identified as internal transfer transactions, based at least in part upon their associated transaction descriptions (e.g., containing keywords such as "atm"). As internal transfer transactions will not be part of an income stream, they may be filtered and removed from the transaction data. In addition, in some embodiments, transactions having a transaction amount under a threshold level (e.g., $100) may be filtered and removed.

At block 1604, transaction names associated with the received transactions may optionally be cleaned. Cleaning the transaction names may comprise removing extraneous keywords, such as dates, that are not relevant to determining the type of transaction or the source of the transaction. In some embodiments, transaction names associated with different accounts may be cleaned differently, based at least in part upon a source associated with each account.

At block 1606, the received transactions are categorized into one or more transaction groups, based at least in part upon a source of the transactions. In some embodiments, the source of a transaction may be determined by parsing the transaction names. Transactions having the same source may be categorized into the same transaction group. In some embodiments, at least a threshold number of transactions must be grouped in order to form a transaction group.

In some embodiments, transactions may be categorized into transaction groups based at least in part upon a date associated with the transactions. For example, a sequence of transactions associated with the same source may be divided into multiple transaction groups, based upon a period of time between consecutive transactions in the sequence.

At block 1608, for each transaction group, a probability or confidence value is calculated, indicative of a likelihood that the transaction group corresponds to an income stream. The probability or confidence value may be based upon the transaction date and transaction amounts of the transactions in the transaction group. For example, the more regular the dates of the transactions in the transaction group, the more likely that the transaction group corresponds to an income stream. In addition, the more uniform the transaction amounts of the transactions in the transaction group, the more likely that the transaction group corresponds to an income stream. Other factors may include a number of transactions in the transaction group, and the transaction names of associated with the transaction group. In some embodiments, one or more scores are calculated reflecting date regularity, amount uniformity, and/or other factors, which may then be aggregated (e.g., as a weighted sum) to obtain the probability or confidence value. In some embodiments, transaction groups with a probability or confidence value lower than a threshold value may be removed from analysis.

At block 1610, an income stream amount is estimated for each transaction group. The transaction amounts associated with the transaction group can be aggregated and divided by a period of time associated with the transaction group to determine the income stream amount (e.g., income per month). In some embodiments, one or more income altering events, such as a raise, may be detected. In some embodiments, the event may be averaged out over the time period of the income stream to calculate the income stream amount. In other embodiments, the income stream amount may be calculated to reflect the post-event income associated with the stream.

At block 1612, a projected income for a future time period is calculated. In some embodiments, one or more currently active income streams are identified, wherein an income stream may be considered currently active if a last transaction associated with the income stream occurred within a threshold period of time from the time the income estimation is performed. The threshold period of time may be different for different income streams, and be based at least in part upon a time period between transactions in the income stream. For example, a first income stream comprising transactions typically spaced two months apart may be considered a currently active income stream if the last transaction of the income stream occurred a month before the date the income estimation is performed, while a second income stream comprising transactions typically spaced three days apart may not be considered a currently active income stream.

In some embodiments, one or more recurring income streams may be identified and used to calculate the projected future income. A group of two or more income streams associated with the same source may be identified as a recurring income stream based at least in part upon level of income uniformity between the income streams in the group, occurrence regularity of the income streams in the group, and a number of income streams in the group.

In some embodiments, if the account is a joint account, different income streams associated with an account may be associated with different owners. When calculating projected income, the income streams may be separated based upon ownership, in order to calculate a projected income for a particular owner.

In some embodiments, calculating a projected income may comprise calculating a pre-tax income and a post-tax income. Different income streams associated with an account may be identified as pre-tax or post-tax. One or more tax rules (e.g., default tax rules or tax rules based upon one or more known attributes of the owner) may be applied to the income streams to determine pre-tax or post-tax income.

In some embodiments, once a projected income for an owner has been determined, the projected income may be used to assess the suitability of the owner as a target for marketing or financial services. For example, certain financial services, such as mortgages, may only be offered to individuals having a projected income above a threshold amount. By being able to quickly and automatically estimate the incomes of various individuals, candidates for financial products and services can be easily identified, allowing the financial products and services to be presented to individuals to which they will be the most relevant.

Additional Implementation Details and Embodiments

Any of the processes, methods, algorithms, elements, blocks, applications, or other functionality (or portions of functionality) described in the preceding sections may be embodied in, and/or fully or partially automated via, modules, segments, and/or portions of software code and/or logic instructions which include one or more executable instructions (as described below) executed by one or more computer systems or computer processors comprising computer hardware. Further, and/or alternatively, any of the processes, methods, algorithms, elements, blocks, applications, or other functionality (or portions of functionality) described in the preceding sections may be embodied in, and/or fully or partially automated via, application-specific processors (e.g., application-specific integrated circuits (ASICs)), programmable processors (e.g., field programmable gate arrays (FPGAs)), application-specific circuitry, and/or the like (any of which may also combine custom hard-wired logic, ASICs, FPGAs, etc. with custom programming/execution of software instructions to accomplish the techniques). For example, the various illustrative logical blocks, methods, routines, and the like described in connection with the embodiments disclosed herein may be implemented as electronic hardware, computer software, or combinations of both. To illustrate this, various illustrative components, blocks, modules, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the disclosure.

For example, the functionality described herein may be performed as software instructions are executed by, and/or in response to software instruction being executed by, one or more hardware processors and/or any other suitable computing devices. The software instructions and/or other executable code may be read from a non-transitory or tangible computer-readable medium.

The term "non-transitory medium," "non-transitory computer-readable medium," "tangible computer-readable storage medium," and similar terms, as used herein are broad terms encompassing their ordinary and customary meanings, and include any mediums that store data and/or instructions that cause a machine (e.g., a computing device) to operate in a specific fashion. Such non-transitory mediums may comprise non-volatile mediums and/or volatile mediums. Non-volatile mediums include, for example, optical or magnetic disks. Volatile mediums include, for example, dynamic memory (e.g., random-access memory (RAM)). Common forms of non-transitory mediums include, for example, floppy disks, flexible disks, hard disks, solid state drives, magnetic tape, or any other magnetic data storage medium, a CD-ROM, a DVD-ROM, any other optical data storage medium, any physical medium with patterns of holes, a RAM, a PROM, and EPROM, a FLASH-EPROM, NVRAM, any other memory chip or cartridge, and networked versions of the same. Non-transitory mediums are distinct from, but may be used in conjunction with, transmission mediums. Transmission mediums participate in transferring information between non-transitory mediums. For example, transmission mediums include coaxial cables, copper wire, and fiber optics, including wires that comprise busses and/or the like within certain computing devices. Transmission mediums may also take the form of acoustic or light waves, such as those generated during radio-wave and infra-red data communications.

Accordingly, a software instruction and/or module may reside in RAM memory, flash memory, ROM memory, hard disk, solid state drive, CD-ROM, DVD-ROM, and/or any other form of a non-transitory computer-readable storage medium. Various forms of mediums may be involved in carrying one or more sequences of one or more instructions to computer processors (of the present disclosure) for execution. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

Any of the above-mentioned processors, and/or devices incorporating any of the above-mentioned processors, may be referred to herein as, for example, "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

In general, the terms "code," "instructions," "module," "application," "software application," and/or the like, as used herein, refer to a collection of software instructions, possibly having entry and exit points, written in a programming language, such as, for example, Java, Lua, C or C++. Such software may be compiled and linked into an executable program, installed in a dynamic link library, or may be written in an interpreted programming language such as, for example, BASIC, Perl, or Python. It will be appreciated that such software instructions may be callable from other software instructions or from itself, and/or may be invoked in response to detected events or interrupts. Software instructions configured for execution on computing devices may be provided on a computer readable medium (e.g., a non-transitory computer readable medium), and/or as a digital download (and may be originally stored in a compressed or installable format that requires installation, decompression or decryption prior to execution) that may then be stored on a computer readable medium (e.g., a non-transitory computer readable medium). Such software instructions may be stored, partially or fully, on a memory device (e.g., a non-transitory computer readable medium) of the executing computing device, for execution by the computing device.

Alternate implementations are included within the scope of the embodiments described herein in which certain elements or functions may be deleted, executed out of order from that shown or discussed, including substantially concurrently (for example, through multi-threaded processing, interrupt processing, or multiple processors or processor cores or on other parallel architectures) or in reverse order, depending on the functionality involved. Further, the various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A first device, comprising:
one or more memories; and
one or more processors, coupled to the one or more memories, configured to:
receive a request for data associated with an account related to an external account system;
instantiate a simulated instance of a first-party application associated with the external account system, wherein the first-party application is configured to interface with the external account system via a first application programming interface (API) of the external account system, wherein the simulated instance is configured to interface with the external account system via the first API,
wherein the simulated instance is configured to appear to the external account system as the first-party application executing on a second device associated with the account,
wherein the simulated instance is configured to query the external account system for transaction data associated with the account, and
wherein the simulated instance is configured to receive the transaction data from the external account system;
categorize transactions associated with the transaction data into one or more transaction groups based on sources of the transactions;
estimate, for a group of the one or more transaction groups and based on transaction amounts associated with transactions related to the group, an estimated attribute value associated with an attribute for the group;
determine, based on the estimated attribute value, an expected future value associated with the attribute; and
provide, via a second API that is different from the first API, the expected future value.

2. The first device of claim 1, wherein estimating the estimated attribute value is based on a confidence value associated with the group satisfying a threshold value.

3. The first device of claim 1, wherein the second API comprises a normalized API.

4. The first device of claim 3, wherein an underlying non-public API is abstracted away for the normalized API.

5. The first device of claim 1, wherein the second device is a user device associated with a user related to the account.

6. The first device of claim 1, wherein estimating the estimated attribute value is based on a confidence value associated with the group satisfying a threshold value, and
wherein the confidence value is determined based on a distribution of the transaction amounts over a time period associated with the transaction group.

7. The first device of claim 1, wherein categorizing the transactions is based on at least one of:
dates associated with the transactions, or
sources associated with the transactions.

8. A first device, comprising:
one or more memories; and
one or more processors, coupled to the one or more memories, configured to:
receive a request for data associated with an account related to an external account system;
instantiate a simulated instance of a first-party application associated with the external account system,
wherein the first-party application is configured to interface with the external account system via a first application programming interface (API) of the external account system,
wherein the simulated instance is configured to interface with the external account system via the first API,
wherein the simulated instance is configured to appear to the external account system as the first-party application executing on a second device associated with the account, and
wherein the simulated instance is configured to receive transaction data, associated with the account, from the external account system;
categorize transactions associated with the transaction data into one or more transaction groups based on sources of the transactions;
estimate, for a group of the one or more transaction groups and based on transaction amounts associated with transactions related to the group, an estimated attribute value associated with an attribute for the group;
determine, based on the estimated attribute value, an expected future value associated with the attribute; and
provide, via a second API, the expected future value.

9. The first device of claim 8, wherein estimating the estimated attribute value is based on a confidence value associated with the group satisfying a threshold value.

10. The first device of claim 8, wherein the second API comprises a normalized API.

11. The first device of claim 10, wherein an underlying non-public API is abstracted away for the normalized API.

12. The first device of claim 8, wherein the second device is a user device associated with a user related to the account.

13. The first device of claim 8, wherein estimating the estimated attribute value is based on a confidence value associated with the group satisfying a threshold value, and
wherein the confidence value is determined based on a distribution of the transaction amounts over a time period associated with the group.

14. The first device of claim 8, wherein categorizing the transactions is based on at least one of:
dates associated with the transactions, or
sources associated with the transactions.

15. A non-transitory computer-readable medium storing a set of instructions, the set of instructions comprising:
one or more instructions that, when executed by one or more processors of a first device, cause the first device to:
receive a request for data associated with an account related to an external account system;
instantiate a simulated instance of a first-party application associated with the external account system,
wherein the first-party application is configured to interface with the external account system via a first application programming interface (API) of the external account system,
wherein the simulated instance is configured to interface with the external account system via the first API,
wherein the simulated instance is configured to appear to the external account system as the first-party application executing on a second device associated with the account, and
wherein the simulated instance is configured to receive transaction data, associated with the account, from the external account system;
categorize transactions associated with the transaction data into one or more transaction groups based on sources of the transactions;
estimate, for a group of the one or more transaction groups and based on transaction amounts associated with transactions related to the group, an estimated attribute value associated with an attribute for the group;
determine, based on the estimated attribute value, an expected future value associated with the attribute; and
provide, via a second API, the expected future value.

16. The non-transitory computer-readable medium of claim 15, wherein estimating the estimated attribute value is based on a confidence value associated with the group satisfying a threshold value.

17. The non-transitory computer-readable medium of claim 15, wherein the second API comprises a normalized API.

18. The non-transitory computer-readable medium of claim 17, wherein an underlying non-public API is abstracted away for the normalized API.

19. The non-transitory computer-readable medium of claim 15, wherein the second device is a user device associated with a user related to the account.

20. The non-transitory computer-readable medium of claim 15, wherein estimating the estimated attribute value is based on a confidence value associated with the group satisfying a threshold value, and
   wherein the confidence value is determined based on a distribution of the transaction amounts over a time period associated with the group.

* * * * *